(12) United States Patent
Wang

(10) Patent No.: US 11,843,726 B2
(45) Date of Patent: Dec. 12, 2023

(54) SIGNALING OF DECODED PICTURE BUFFER PARAMETERS IN LAYERED VIDEO

(71) Applicant: Bytedance Inc., Los Angeles, CA (US)

(72) Inventor: Ye-kui Wang, San Diego, CA (US)

(73) Assignee: BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/848,504

(22) Filed: Jun. 24, 2022

(65) Prior Publication Data

US 2022/0329869 A1    Oct. 13, 2022

Related U.S. Application Data

(63) Continuation of application No. PCT/US2020/067019, filed on Dec. 24, 2020.

(Continued)

(51) Int. Cl.
*H04N 19/70* (2014.01)
*H04N 19/44* (2014.01)
(Continued)

(52) U.S. Cl.
CPC ........... *H04N 19/70* (2014.11); *H04N 19/105* (2014.11); *H04N 19/172* (2014.11); *H04N 19/187* (2014.11); *H04N 19/44* (2014.11)

(58) Field of Classification Search
CPC ...... H04N 19/70; H04N 19/44; H04N 19/172; H04N 19/187; H04N 19/30; H04N 19/58; G06V 20/46
See application file for complete search history.

(56) References Cited

U.S. PATENT DOCUMENTS 9,241,158 B2   1/2016   Wang
9,270,651 B2   2/2016   Sun et al.
(Continued)

FOREIGN PATENT DOCUMENTS

CA      2884352 C        4/2014
JP      2003087785 A     3/2003
(Continued)

OTHER PUBLICATIONS

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.

(Continued)

*Primary Examiner* — Michael J Hess
*Assistant Examiner* — Naod W Belai
(74) *Attorney, Agent, or Firm* — Perkins Coie LLP

(57) ABSTRACT

A method of video processing includes performing a conversion between a video and a bitstream of the video. The bitstream includes one or more output layer sets each including one or more video layers. The bitstream conforms to a format rule, wherein the format rule specifies that a number of decoded picture buffer parameter syntax structures included in a video parameter set for the bitstream is equal to: zero, in a case that each output layer set includes a single video layer; or one plus a value of a syntax element, in a case that each output layer set includes a single layer is not true.

20 Claims, 15 Drawing Sheets

750 performing a conversion between a video comprising a plurality of video layers and a bitstream representation of the video, wherein a format rule specifies that, for a layer i, where i is an integer, the bitstream representation includes a set of first syntax element indicative of a first variable indicating whether the layer i is included in at least one of the plurality of OLSs — 752

Related U.S. Application Data

(60) Provisional application No. 62/955,185, filed on Dec. 30, 2019, provisional application No. 62/953,854, filed on Dec. 26, 2019.

(51) Int. Cl.
*H04N 19/105* (2014.01)
*H04N 19/172* (2014.01)
*H04N 19/187* (2014.01)

(56) References Cited

U.S. PATENT DOCUMENTS

| | | |
|---|---|---|
| 9,319,703 B2 | 4/2016 | Wang |
| 9,374,585 B2 | 6/2016 | Wang |
| 9,402,076 B2 | 7/2016 | Wang et al. |
| 9,432,664 B2 | 8/2016 | Wang |
| 9,485,508 B2 | 11/2016 | Wang et al. |
| 9,497,485 B2 | 11/2016 | Deng et al. |
| 9,571,809 B2 | 2/2017 | Deng et al. |
| 9,635,369 B2 | 4/2017 | Chen et al. |
| 9,756,335 B2 | 9/2017 | Chen et al. |
| 9,769,492 B2 | 9/2017 | Hendry et al. |
| 9,788,007 B2 | 10/2017 | Wang et al. |
| 9,813,719 B2 | 11/2017 | Wang |
| 9,819,948 B2 | 11/2017 | Wang |
| 9,838,363 B2 | 12/2017 | Sun et al. |
| 9,848,199 B2 | 12/2017 | Ramasubramonian et al. |
| 9,854,270 B2 | 12/2017 | Ramasubramonian et al. |
| 9,900,605 B2 | 2/2018 | Ramasubramonian et al. |
| 9,918,091 B2 | 3/2018 | Wang et al. |
| 9,924,166 B2 | 3/2018 | Ye et al. |
| 9,930,342 B2 | 3/2018 | Wang et al. |
| 9,973,782 B2 | 5/2018 | Wang |
| 9,979,971 B2 | 5/2018 | Ramasubramonian et al. |
| 9,992,492 B2 | 6/2018 | Rodriguez et al. |
| 10,021,394 B2 | 7/2018 | Wang |
| 10,063,867 B2 | 8/2018 | Wang |
| 10,097,846 B2 | 10/2018 | Deshpande |
| 10,171,842 B2 | 1/2019 | Hendry et al. |
| 10,212,435 B2 | 2/2019 | Ramasubramonian et al. |
| 10,257,519 B2 | 4/2019 | Deshpande |
| 10,264,286 B2 | 4/2019 | Ramasubramonian et al. |
| 10,306,269 B2 | 5/2019 | Hendry et al. |
| 10,390,087 B2 | 8/2019 | Ramasubramonian et al. |
| 10,542,261 B2 | 1/2020 | Wang et al. |
| 10,666,953 B2 | 5/2020 | Ye et al. |
| 2003/0001964 A1 | 1/2003 | Maskura et al. |
| 2004/0076237 A1 | 4/2004 | Kadono et al. |
| 2005/0190774 A1 | 9/2005 | Wiegand |
| 2006/0089119 A1 | 4/2006 | Lipasti et al. |
| 2008/0181228 A1 | 7/2008 | Hannuksela et al. |
| 2009/0097768 A1 | 4/2009 | Seregin et al. |
| 2010/0189182 A1 | 7/2010 | Mannuksela |
| 2012/0044322 A1 | 2/2012 | Tian et al. |
| 2013/0182755 A1 | 7/2013 | Chen et al. |
| 2013/0272370 A1 | 10/2013 | Coban et al. |
| 2013/0294500 A1 | 11/2013 | Wang |
| 2014/0003489 A1 | 1/2014 | Hannuksela |
| 2014/0003531 A1 | 1/2014 | Coban et al. |
| 2014/0086303 A1 | 3/2014 | Wang |
| 2014/0086305 A1 | 3/2014 | Esenlik et al. |
| 2014/0086333 A1 | 3/2014 | Wang |
| 2014/0086336 A1 | 3/2014 | Wang |
| 2014/0092976 A1 | 4/2014 | Deshpande |
| 2014/0098851 A1 | 4/2014 | Chen et al. |
| 2014/0192858 A1 | 7/2014 | Haque et al. |
| 2014/0192859 A1 | 7/2014 | Haque et al. |
| 2014/0294062 A1 | 10/2014 | Chen et al. |
| 2015/0016532 A1 | 1/2015 | Chen et al. |
| 2015/0023405 A1 | 1/2015 | Joshi et al. |
| 2015/0023409 A1 | 1/2015 | Schierl et al. |
| 2015/0055712 A1 | 2/2015 | Hannuksela et al. |
| 2015/0078458 A1 | 3/2015 | Samuelsson et al. |
| 2015/0103886 A1 | 4/2015 | He et al. |
| 2015/0103887 A1 | 4/2015 | Ramasubramonian et al. |
| 2015/0103888 A1 | 4/2015 | Chen et al. |
| 2015/0103927 A1 | 4/2015 | Hannuksela |
| 2015/0156501 A1 | 6/2015 | Hannuksela |
| 2015/0181233 A1 | 6/2015 | Ramasubramonian et al. |
| 2015/0189322 A1 | 7/2015 | He et al. |
| 2015/0271513 A1 | 9/2015 | Hendry et al. |
| 2015/0271528 A1 | 9/2015 | Wang et al. |
| 2015/0281713 A1 | 10/2015 | Suzuki et al. |
| 2015/0304665 A1 | 10/2015 | Hannuksela et al. |
| 2015/0319448 A1 | 11/2015 | Ramasubramonian et al. |
| 2015/0358640 A1 | 12/2015 | Hendry et al. |
| 2015/0373361 A1 | 12/2015 | Wang et al. |
| 2015/0382022 A1 | 12/2015 | Ramasubramonian et al. |
| 2016/0044324 A1 | 2/2016 | Deshpande |
| 2016/0112724 A1 | 4/2016 | Hendry et al. |
| 2016/0165248 A1 | 6/2016 | Lainema et al. |
| 2016/0261868 A1 | 9/2016 | Chien et al. |
| 2016/0261877 A1 | 9/2016 | Wang |
| 2016/0309159 A1 | 10/2016 | Deshpande |
| 2016/0323592 A1 | 11/2016 | Choi et al. |
| 2016/0323600 A1 | 11/2016 | Ma |
| 2017/0006294 A1 | 1/2017 | Huang et al. |
| 2017/0006300 A1 | 1/2017 | Tsukuba et al. |
| 2017/0019673 A1 | 1/2017 | Tsukuba et al. |
| 2017/0085878 A1 | 1/2017 | Sole Rojals et al. |
| 2017/0105014 A1 | 4/2017 | Lee et al. |
| 2017/0134737 A1 | 5/2017 | Lu et al. |
| 2017/0240547 A1 | 8/2017 | Resnick et al. |
| 2017/0264905 A1 | 9/2017 | Yin et al. |
| 2017/0324981 A1 | 11/2017 | Deshpande |
| 2017/0347026 A1 | 11/2017 | Hannuksela |
| 2018/0176575 A1 | 6/2018 | Wang et al. |
| 2018/0184093 A1 | 6/2018 | Xu et al. |
| 2019/0020886 A1 | 1/2019 | Mannuksela |
| 2019/0075306 A1 | 3/2019 | Hendry et al. |
| 2019/0082184 A1 | 3/2019 | Hannuksela |
| 2019/0166370 A1 | 5/2019 | Xiu et al. |
| 2019/0238835 A1 | 8/2019 | Lee |
| 2019/0253726 A1 | 8/2019 | Tabatabai et al. |
| 2019/0306494 A1 | 10/2019 | Chang et al. |
| 2019/0342562 A1 | 11/2019 | Hannuksela |
| 2020/0177923 A1 | 6/2020 | Chen et al. |
| 2020/0252629 A1 | 8/2020 | Ye et al. |
| 2021/0185306 A1 | 6/2021 | Chuang et al. |
| 2021/0195248 A1 | 6/2021 | Coban et al. |
| 2021/0337198 A1 | 10/2021 | Wang et al. |
| 2021/0337226 A1 | 10/2021 | Wang et al. |
| 2021/0337227 A1 | 10/2021 | Wang et al. |
| 2022/0030222 A1 | 1/2022 | Ma et al. |
| 2022/0060694 A1 | 2/2022 | Wang et al. |
| 2022/0086385 A1 | 3/2022 | Wang et al. |
| 2022/0086495 A1 | 3/2022 | Wang et al. |
| 2022/0116644 A1 | 4/2022 | Zheng et al. |
| 2022/0124359 A1 | 4/2022 | Wang et al. |
| 2022/0191533 A1 | 6/2022 | Wang |
| 2022/0210458 A1 | 6/2022 | Wang |
| 2022/0217357 A1 | 7/2022 | Wang |
| 2022/0217359 A1 | 7/2022 | Wang et al. |
| 2022/0217374 A1 | 7/2022 | Wang et al. |
| 2022/0217376 A1 | 7/2022 | Wang et al. |
| 2022/0217384 A1 | 7/2022 | Wang |
| 2022/0217390 A1 | 7/2022 | Wang et al. |
| 2022/0217394 A1 | 7/2022 | Wang et al. |
| 2022/0217395 A1 | 7/2022 | Wang et al. |
| 2022/0217417 A1 | 7/2022 | Wang et al. |
| 2022/0224897 A1 | 7/2022 | Zhang et al. |
| 2022/0232258 A1 | 7/2022 | Wang et al. |
| 2022/0272378 A1 | 8/2022 | Samuelsson et al. |
| 2022/0286669 A1 | 9/2022 | Hendry et al. |
| 2022/0303546 A1 * | 9/2022 | Nishi .............. H04N 19/70 |
| 2022/0312042 A1 | 9/2022 | Deshpande |
| 2022/0321901 A1 | 10/2022 | Wang |
| 2022/0329868 A1 | 10/2022 | Wang |
| 2022/0337815 A1 | 10/2022 | Wang |
| 2022/0337880 A1 | 10/2022 | Wang |
| 2022/0345745 A1 | 10/2022 | Deshpande |
| 2022/0345747 A1 | 10/2022 | Wang |
| 2022/0345748 A1 | 10/2022 | Ma et al. |

(56) References Cited

U.S. PATENT DOCUMENTS

2022/0377379 A1 11/2022 Wang
2022/0377380 A1 11/2022 Wang
2022/0400280 A1 12/2022 Hendry
2023/0068404 A1 3/2023 Deshpande

FOREIGN PATENT DOCUMENTS

| JP | 2017522779 A | 8/2017 |
|---|---|---|
| KR | 20180019557 A | 2/2018 |
| WO | 2010069427 A1 | 6/2010 |
| WO | 2014162750 A1 | 10/2014 |
| WO | 2015137237 A1 | 9/2015 |
| WO | 2016205747 A1 | 12/2016 |
| WO | 2019195035 A1 | 10/2019 |
| WO | 2021117813 A1 | 6/2021 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al. "Algorithm Description for Versatile Video Coding and Test Model 7 (VTM 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2002, 2019.
"Information Technology—High Efficiency Coding and Media Delivery in Heterogeneous Environments—Part 2: High Efficiency Video Coding" Apr. 20, 2018, ISO/DIS 23008, 4th Edition.
Lin et al. "Multiple Description Coding for Scalable Video Coding with Redundant Slice," IEEE, 2012, retrieved on Feb. 28, 2021 from the internet <URL: https://ieeexplore.ieee.org/stamp/stamp.jsp?tp=&amumber=8506581>.
Tech et al. "Overview of the Multiview and 3D Extensions of High Efficiency Video Coding," 2015 IEEE Transactions on Circuits and Systems for Video Technology 26.1, Sep. 11, 2015, pp. 35-49.
VTM software: https://vcgit.hhi.fraunhofer.de/jvet/VVCSoftware_VTM.git.
International Search Report and Written Opinion from International Patent Application No. PCT/US2020/067011 dated Mar. 24, 2021 (9 pages).
International Search Report and Written Opinion from International Patent Application No. PCT/US2020/067015 dated Mar. 15, 2021 (11 pages).
International Search Report and Written Opinion from International Patent Application No. PCT/US2020/067016 dated Mar. 25, 2021 (9 pages).
International Search Report and Written Opinion from International Patent Application No. PCT/US2020/067019 dated Mar. 25, 2021 (10 pages).
International Search Report and Written Opinion from International Patent Application No. PCT/US2020/067021 dated Mar. 25, 2021 (14 pages).
International Search Report and Written Opinion from International Patent Application No. PCT/US2020/067023 dated Mar. 15, 2021 (9 pages).
Non Final Office Action from U.S. Appl. No. 17/839,860 dated Aug. 3, 2022.
Choi et al. "AHG9: On Signalling IRAP and GDR Pictures," Joint Video Experts Team (JVET) of ITU-T SG 16 WP 3 and ISO/IEC JTC 1/SC 29/WG 11 19th Meeting, by teleconference, Jun. 22-Jul. 1, 2020, document JVET-S0055, 2020.
Choi et al. "AHG9: Bugfix and Cleanup on ph_no_output_of_prior_pics_flag and ph_ghr_or_irap_pic_flag," Joint Video Experts Team (JVET) of ITU-T SG 16 WP 3 and ISO/IEC JTC 1/SC 29/WG 11 19th Meeting, by teleconference, Jun. 22-Jul. 1, 2020, document JVET-S0193, 2020.
Coban et al. "AHG9: On Picture Header IRAP/GDR Signalling," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0154, 2020.
Drugeon et al. "AHG9: On Order of HRD Related SEI Messages," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0048, 2020.
Sjoberg et al. "AHG9: Picture Header Enabled Flag," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0426, 2020. sections 7.3.9.
Extended European Search Report for European Patent Application No. 21738379.3 dated Apr. 6, 2023 (11 pages).
Partial Supplementary Search Report for European Patent Application No. 21738101.1 dated May 9, 2023 (10 pages).
Final Office Action from U.S. Appl. No. 17/860,634 dated Apr. 5, 2023.
Final Office Action from U.S. Appl. No. 17/860,687 dated Apr. 14, 2023.
Deshpande et al. "AHG9: On PTL and HRD Parameters Signalling in VPS," Joint Video Experts Team (JVET) of ITU-T SG 16 WP 3 and ISO/IEC JTC 1/SC 29/WG 11 17th Meeting, Brussels, BE Jan. 7-17, 2020, document JVET-Q0786, 2020.
Nishi et al. "AHG9: On Signalling of PTL/HRD Parameters for Single Layer OLSs and DPB Parameters for Independent Layers," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0046, 2020.
Wang, Ye-Kui, "Report of BoG on High-Level Syntax," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0968, 2019.
Wang, Ye-Kui, "AHG8: Scalability—General and Output Layer Sets," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0115, 2019.
Wang, Ye-Kui, "AHG8: Signalling of Output Layer Sets," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0119, 2019.
Extended European Search Report from European Application No. 20907698.3 dated Dec. 12, 2022 (8 pages).
Extended European Search Report from European Application No. 20905531.8 dated Nov. 28, 2022 (9 pages).
Extended European Search Report from European Application No. 20904355.3 dated Nov. 29, 2022 (9 pages).
Examination Report from Indian Patent Application No. 202227036458 dated Oct. 20, 2022 (8 pages).
Examination Report from Indian Patent Application No. 202227036459 dated Nov. 2, 2022 (6 pages).
Notice of Allowance from U.S. Appl. No. 17/845,536 dated Oct. 4, 2022.
Non Final Office Action from U.S. Appl. No. 17/845,400 dated Oct. 6, 2022.
Non Final Office Action from U.S. Appl. No. 17/839,860 dated Nov. 22, 2022.
Wang et al. "Miscellaneous Fixes for HLS in Specification," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0197, 2020.
Extended European Search Report for European Patent Application No. 21738315.7 dated Mar. 2, 2023 (7 pages).
Non Final Office Action from U.S. Appl. No. 17/859,826 dated Dec. 30, 2022.
Non Final Office Action from U.S. Appl. No. 17/850,449 dated Feb. 2, 2023.
Boyce et al. HEVC Additional Supplemental Enhancement Information (Draft 4), Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, document JCTVC-AC1005, 2017.

(56) References Cited

OTHER PUBLICATIONS

Boyce et al. "Sub-Pictures and Sub-Picture Sets with Level Derivation," Joint Video Experts Team (JVET) of ITU-T SG 16 WP 3 and ISO/IEC JTC 1/SC 29/WG 11 15th Meeting, Gothenburg, SE, Jul. 3-12, 2019, document JVET-O0555, 2019.
Bross et al. "High Efficiency Video Coding (HEVC) Text Specification Draft 9," Joint Collaborative Team on Video Coding (JCT-VC) of ITU-T SG16 WP3 and ISO/IEC JTC1/SC29/WG11 11th Meeting: Shanghai, CN, Oct. 10-19, 2012, document JCTVC-K1003, 2012.
Bross et al. "Versatile Video Coding (Draft 10)," Joint Video Experts Team (JVET) of ITU-T SG 16 WP 3 and ISO/IEC JTC 1/SC 29/WG 11 19th Meeting: by teleconference Jun. 22-Jul. 1, 2020, document JVET-S2001, 2020.
Choi et al. "AHG8: Output Layer Set and PTL Signaling, " Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0225, 2019.
Hendry et al. "AHG9: On Miscellaneous Updates for HLS Signalling," Joint Video Experts Team (JVET) of ITU-T SG 16 WP 3 and ISO/IEC JTC 1/SC 29/WG 11 18th Meeting: by teleconference Apr. 15-24, 2020, document JVET-R0191, 2020.
Kotra et al. "Non-CE5: Chroma QP Derivation Fix for Deblocking Filter (Combination of JVET-P0105 and JVET-P0539)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P1001, 2019.
Ramasubramonian et al. SHVC/MV-HEVC level Definitions and Related Decoder Capability Requirements, Joint Collaborative Team on Video Coding (JCT-VC) of ITU-T SG 16 WP 3 and ISO/IEC JTC 1/SC 29/WG 11 18th Meeting: Sapporo, JP, Jun. 30-Jul. 9, 2014, document JCTVC-R0043, and JCT3V-I0022, 2014.
Sarwer et al . "CE3-related: CTU Level Local Lossless Coding of VVC," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0294, 2020.
Sjoberg et al. "Overview of HEVC High-Level Syntax and Reference Picture Management," IEEE Transactions on Circuits and Systems for Video Technology, Dec. 2012, 22(12):1858-1870.
Sullivan et al. "Standardized Extensions of High Efficiency Video Coding (HEVC)," IEEE Journal of Selected Topics in Signal Processing, Dec. 2013, 7(6):1001-1016.
Wang, Ye-Kui, "AHG8: Signalling of Output Layer Sets," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P1019, 2019.
Wang et al. "AHG12: Cleanups on Signalling of Subpictures, Tiles, and Rectangular Slices," Joint Video Experts Team (JVET) of ITU-T SG 16 WP3 and ISO/IEC JTC 1/SC 29/WG 11 17th Meeting, Brussels, BE, Jan. 7-17, 2020, document JVET-Q0119, 2020.
Zhu et al. "CE2-1.1: QP Dependent Fixed-Length Binarization for Escape Coding." Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0075, 2020.
Extended European Search Report for European Patent Application No. 20906637.2 dated Dec. 14, 2022 (8 pages).
Extended European Search Report for European Patent Application No. 21738381.9 dated Jan. 2, 2023 (8 pages).
Examination Report from Indian Patent Application No. 202247038995 dated Oct. 12, 2022 (5 pages).
Examination Report from Indian Patent Application No. 202247039473 dated Oct. 19, 2022 (5 pages).
International Search Report and Written Opinion from International Patent Application No. PCT/US2020/067090 dated Mar. 23, 2021 (17 pages).
International Search Report and Written Opinion from International Patent Application No. PCT/US2020/067091 dated Mar. 25, 2021 (10 pages).
International Search Report and Written Opinion from International Patent Application No. PCT/US2021/012035 dated Mar. 24, 2021 (11 pages).
International Search Report and Written Opinion from International Patent Application No. PCT/US2021/012830 dated Mar. 23, 2021 (11 pages).
International Search Report and Written Opinion from International Patent Application No. PCT/US2021/012831 dated Mar. 23, 2021 (9 pages).
International Search Report and Written Opinion from International Patent Application No. PCT/US2021/012833 dated Jul. 7, 2021 (85 pages).
International Search Report and Written Opinion from International Patent Application No. PCT/US2021/012835 dated Apr. 1, 2021 (8 pages).
International Search Report and Written Opinion from International Patent Application No. PCT/US2021/012837 dated Mar. 25, 2021 (18 pages).
International Search Report and Written Opinion from International Patent Application No. PCT/US2021/012838 dated Apr. 1, 2021 (11 pages).
International Search Report and Written Opinion from International Patent Application No. PCT/US2021/012840 dated May 5, 2021 (11 pages).
Non Final Office Action from U.S. Appl. No. 17/848,525 dated Jan. 3, 2023.
Non Final Office Action from U.S. Appl. No. 17/859,733 dated Oct. 17, 2022.
Non Final Office Action from U.S. Appl. No. 17/850,626 dated Dec. 30, 2022.
Non Final Office Action from U.S. Appl. No. 17/850,670 dated Jan. 6, 2023.
Non Final Office Action from U.S. Appl. No. 17/860,634 dated Dec. 22, 2022.
Non Final Office Action from U.S. Appl. No. 17/860,687 dated Dec. 22, 2022.
Bross et al. "Versatile Video Coding (Draft 9)," Joint Video Experts Team (JVET) of ITU-T SG 16 WP 3 and ISO/IEC JTC 1/SC 29/WG 11 18th Meeting, by teleconference, Apr. 15-24, 2020, document JVET-R2001, 2020, pp. 8,38-40,94-99.
Wang, Ye-Kui, "AHG8: Scalability—HRD," Joint Video Experts Team (JVET) of ITU-T SG 16 WP 3 and ISO/IEC JTC 1/SC 29/WG 11 16th Meeting, Geneva, CH, Oct. 1-11, 2019, document JVET-P0118, 2019, pp. 36-38,88-92.
Wang, Ye-Kui "AHG8: Scalability—PTL and Decoder Capability," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0117, 2019.

\* cited by examiner

performing a conversion between a video and a bitstream of the video, wherein the bitstream comprises one or more output layer sets (OLSs) each comprising one or more video layers, wherein the bitstream conforms to a format rule; wherein the format rule specifies whether or how a first syntax structure descriptive of general hypothetical reference decoder (HRD) parameters and a number of second syntax structures descriptive of OLS-specific HRD parameters are included in a video parameter set (VPS) for the bitstream

FIG. 71

SIGNALING OF DECODED PICTURE BUFFER PARAMETERS IN LAYERED VIDEO

CROSS-REFERENCE TO RELATED APPLICATIONS

This application is a continuation of International Patent Application No. PCT/US2020/067019 filed on Dec. 24, 2020, which claims the priority to and benefits of U.S. Provisional Application No. 62/953,854, filed on Dec. 26, 2019, and U.S. Provisional Application No. 62/955,185, filed on Dec. 30, 2019. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders to perform video encoding or decoding.

In one example aspect, a video processing method is disclosed. The method includes performing a conversion between a video comprising one or more scalable video layers and a bitstream of the video. The video comprises one or more video pictures comprising one or more slices. The bitstream conforms to a format rule. The format rule specifies that a value of a field indicative of a slice type of a slice is set to indicate a type of intra slice in case that a corresponding network abstraction layer unit type is in a predetermined range and that a corresponding video layer flag indicates that a video layer corresponding to the slice does not use inter-layer prediction.

In another example aspect, a video processing method is disclosed. The method includes performing a conversion between a video comprising a plurality of video layers and a bitstream of the video, wherein the bitstream comprises a plurality of output layer sets (OLSs), each comprising one or more of the plurality of scalable video layers, and the bitstream conforms to a format rule, wherein the format rule specifies that, for an OLS having a single layer, a profile-tier-level (PTL) syntax structure that indicates a profile, a tier and a level for the OLS is included in a video parameter set for the bitstream, and the PTL syntax structure for the OLS is also included in a sequence parameter set coded in the bitstream.

In another example aspect, a video processing method is disclosed. The method includes performing a conversion between a video comprising a plurality of video layers and a bitstream of the video, wherein the bitstream comprises a plurality of output layer sets (OLSs), each of which comprises one or more of the plurality of video layers, and the bitstream conforms to a format rule, wherein the format rule specifies a relationship between occurrence of a number of profile-tier-level (PTL) syntax structures in a video parameter set for the bitstream and a byte alignment syntax field in the video parameter set; wherein each PTL syntax structure indicates a profile, a tier and a level of one or more of the plurality of OLS.

In another example aspect, a video processing method is disclosed. The method includes performing a conversion between a video comprising a plurality of scalable video layers and a bitstream of the video, wherein the bitstream comprises a plurality of output layer sets (OLSs), each comprising one or more of the plurality of scalable video layers, and the bitstream conforms to a format rule, wherein the format rule specifies that: during encoding, a syntax element indicative of an index to a syntax structure describing a profile, a tier and a level of one or more of the plurality of OLSs is excluded from a video parameter set for the bitstream in case that a value of the index is zero, or, during decoding, the value is inferred to be zero in case that the syntax element is not present in the bitstream.

In another example aspect, a video processing method is disclosed. The method includes performing a conversion between a video comprising a plurality of video layers and a bitstream of the video, wherein the bitstream comprises a plurality of output layer sets (OLSs), each of which comprises one or more of the plurality of video layers, and the bitstream conforms to a format rule, wherein the format rule specifies that, for a layer i, where i is an integer, the bitstream includes a set of first syntax element indicative of a first variable indicating whether the layer i is included in at least one of the plurality of OLSs.

In another example aspect, a video processing method is disclosed. The method includes performing a conversion between a video and a bitstream of the video, wherein the bitstream includes one or more output layer sets each comprising one or more video layers; wherein the bitstream conforms to a format rule, wherein the format rule specifies that a number of decoded picture buffer parameter syntax structures included in a video parameter set for the bitstream is equal to: zero, in a case that each output layer set includes a single video layer; or one plus a value of a syntax element, in a case that each output layer set includes a single layer is not true.

In another example aspect, a video processing method is disclosed. The method includes performing a conversion between a video and a bitstream of the video, wherein the bitstream includes a coded video sequence (CVS) comprising one or more coded video pictures of one or more video layers; and wherein the bitstream conforms to a format rule that specifies that one or more sequence parameter sets (SPS) indicative of conversion parameters that are referred to by the one or more coded pictures of the CVS have a same reference video parameter set (VPS) identifier indicative of a referenced VPS.

In another example aspect, a video processing method is disclosed. The method includes performing a conversion between a video and a bitstream of the video, wherein the bitstream comprises one or more output layer sets (OLSs) each comprising one or more video layers, wherein the bitstream conforms to a format rule; wherein the format rule specifies whether or how a first syntax element indicating whether a first syntax structure descriptive of parameters of a hypothetical reference decoder (HRD) used for the conversion is included in a video parameter set (VPS) of the bitstream.

In another example aspect, a video processing method is disclosed. The method includes performing a conversion between a video and a bitstream of the video, wherein the bitstream comprises one or more output layer sets (OLSs) each comprising one or more video layers, wherein the bitstream conforms to a format rule; wherein the format rule specifies whether or how a first syntax structure descriptive of general hypothetical reference decoder (HRD) parameters and a number of second syntax structures descriptive of OLS-specific HRD parameters are included in a video parameter set (VPS) for the bitstream.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

In yet another example aspect, a method for writing a bitstream generated according to one of the above methods to a computer readable medium is disclosed.

In another example aspect, a computer readable medium storing a bitstream of a video generated according to an above-described method is disclosed.

These, and other, features are described throughout the present document.

BRIEF DESCRIPTION OF DRAWINGS

FIGS. 7A-7I are flowchart for various video processing method examples.

DETAILED DESCRIPTION

Figure 1:
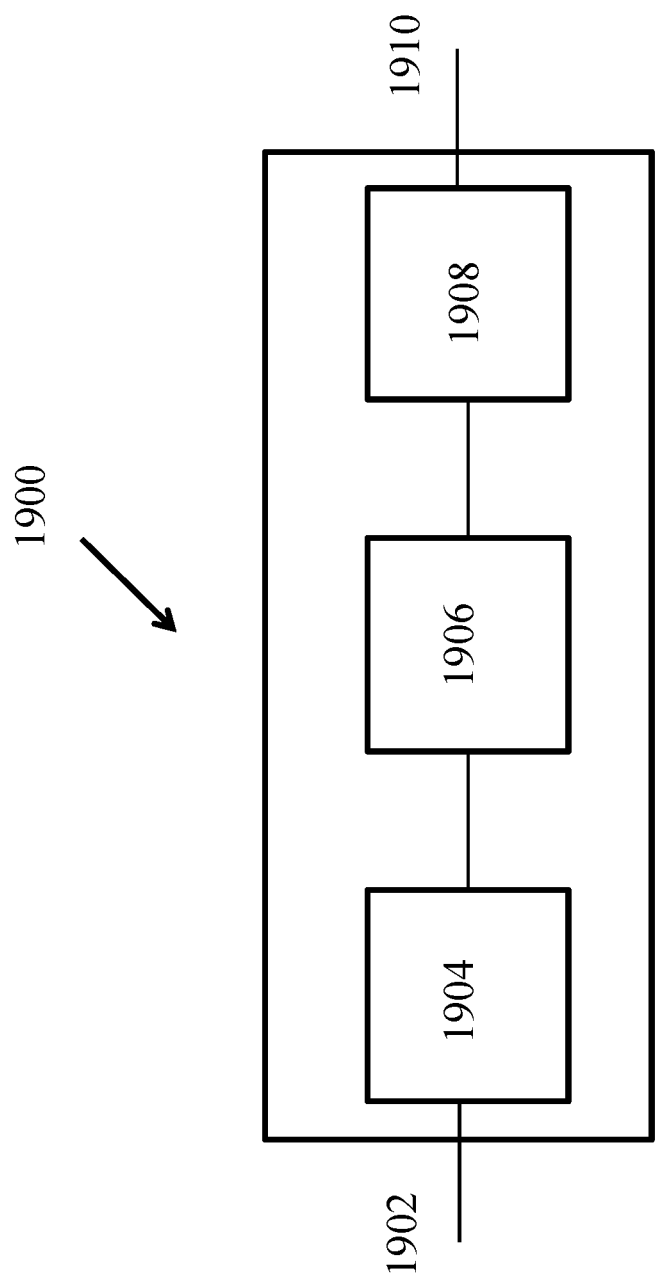
FIG. 1 is a block diagram that illustrates a video coding system in accordance with some embodiments of the present disclosure.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Summary

This document is related to video coding technologies. Specifically, it is about various improvements in scalable video coding, wherein a video bitstream can contains more than one layer. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RBSP Raw Byte Sequence Payload
SEI Supplemental Enhancement Information
SPS Sequence Parameter Set
SVC Scalable Video Coding
VCL Video Coding Layer
VPS Video Parameter Set
VTM VVC Test Model
VUI Video Usability Information
VVC Versatile Video Coding 3. Initial Discussion Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC [1] standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM) [2]. The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Scalable Video Coding (SVC) in General

Scalable video coding (SVC) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e. g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

3.2. Parameter Sets

AVC, HEVC, and VVC specify parameter sets. The types of parameter sets include SPS, PPS, APS, VPS, and DPS. SPS and PPS are supported in all of AVC, HEVC, and VVC. VPS was introduced since HEVC and is included in both HEVC and VVC. APS and DPS were not included in AVC or HEVC, but are included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of these information can be avoided. Furthermore, the use of SPS and PPS enables out-of-b and transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

DPS was introduced for carrying bitstream-level information that indicates the highest capability needed for decoding the entire bitstream.

3.3. VPS Syntax and Semantics in VVC

VVC supports scalability, also known as scalable video coding, wherein multiple layers can be encoded in one coded video bitstream.

In the latest VVC text, the scalability information is signalled in the VPS, the syntax and semantics are as follows.

7.3.2.2 Video Parameter Set Syntax

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) | |
|         for( j = 0; j < i; j++ ) | |
|           vps_direct_ref_layer_flag[ i ][ j ] | u(1) |
|     } | |
|   } | |
|   if( vps_max_layers_minus1 > 0 ) { | |
|     if( vps_all_independent_layers_flag ) | |
|       each_layer_is_an_ols_flag | u(1) |
|     if( !each_layer_is_an_ols_flag ) { | |
|       if( !vps_all_independent_layers_flag ) | |
|         ols_mode_idc | u(2) |
|       if( ols_mode_idc == 2 ) { | |
|         num_output_layer_sets_minus1 | u(8) |
|         for( i = 1; i <= num_output_layer_sets_minus1; i++) | |
|           for( j = 0; j <= vps_max_layers_minus1; j++ ) | |
|             ols_output_layer_flag[ i ][ j ] | u(1) |
|       } | |
|     } | |
|   } | |

-continued

|  | Descriptor |
|---|---|
| vps_num_ptls | u(8) |
| for( i = 0; i < vps_num_ptls; i++ ) { | |
|   if( i > 0 ) | |
|     pt_present_flag[ i ] | u(1) |
|   if( vps_max_sublayers_minus1 > 0 && !vps_all_layers_same_num_sub- | |
|   layers_flag ) | |
|     ptl_max_temporal_id[ i ] | u(3) |
| } | |
| while( !byte_aligned( ) ) | |
|   vps_ptl_byte_alignment_zero_bit /* equal to 0 */ | u(1) |
| for( i = 0; i < vps_num_ptls; i++ ) | |
|   profile_tier_level( pt_present_flag[ i ], ptl_max_temporal_id[ i ] ) | |
| for( i = 0; i < TotalNumOlss; i++ ) | |
|   if( NumLayersInOls[ i ] > 1 && vps_num_ptls> 1 ) | |
|     ols_ptl_idx[ i ] | u(8) |
| if( !vps_all_independent_layers_flag ) | |
|   vps_num_dpb_params | ue(v) |
| if( vps_num_dpb_params>0 ) { | |
|   same_dpb_size_output_or_nonoutput_flag | u(1) |
|   if( vps_max_sublayers_minus1 > 0 ) | |
|     vps_sublayer_dpb_params_present_flag | u(1) |
| } | |
| for( i = 0; i < vps_num_dpb_params; i++ ) { | |
|   dpb_size_only_flag[ i ] | u(1) |
|   if( vps_max_sub_layers_minus1 > 0 && !vps_all_layers_same_num_sub- | |
|   layers_flag ) | |
|     dpb_max_temporal_id[ i ] | u(3) |
|   dpb_parameters( dpb_size_only_flag[ i ], dpb_max_temporal_id[ i ], | |
|       vps_sublayer_dpb_params_present_flag ) | |
| } | |
| for( i = 0; i < vps_max_layers_minus1 && vps_num_dpb_params> 1; i++ ) { | |
|   if( !vps_independent_layer_flag[ i ] ) | |
|     layer_output_dpb_params_idx[ i ] | ue (v) |
|   if( LayerUsedAsRefLayerFlag[ i ] && !same_dpb_size_output_or_nonoutput_flag ) | |
|     layer_nonoutput_dpb_params_idx[ i ] | ue (v) |
| } | |
| vps_general_hrd_params_present_flag | u(1) |
| if( vps_general_hrd_params_present_flag ) { | |
|   general_hrd_parameters( ) | |
|   if( vps_max_sublayers_minus1 > 0 ) | |
|     vps_sublayer_cpb_params_present_flag | u(1) |
|   if( TotalNumOlss > 1 ) | |
|     num_ols_hrd_params_minus1 | ue (v) |
|   for( i = 0; i <= num_ols_hrd_params_minus1; i++ ) { | |
|     if( vps_max_sublayers_minus1 > 0 && !vps_all_layers_same_num_sub- | |
|     layers_flag ) | |
|       hrd_max_tid[ i ] | u (3) |
|     firstSubLayer = vps_sublayer_cpb_params_present_flag ? 0 : hrd_max_tid[ i ] | |
|     ols_hrd_parameters( firstSubLayer, hrd_max_temporal_id[ i ] ) | |
|   } | |
|   if( num_ols_hrd_params_minus1 > 0 ) | |
|     for( i = 1; i < TotalNumOlss; i++) | |
|       ols_hrd_idx[ i ] | ue (v) |
| } | |
| vps_extension_flag | u(1) |
| if( vps_extension_flag ) | |
|   while( more_rbsp_data( ) ) | |
|     vps_extension_data_flag | u(1) |
| rbsp_trailing_bits( ) | |
| } | |

7.4.3.2 Video Parameter Set RBSP Semantics

A VPS RBSP shall be available to the decoding process prior to it being referenced, included in at least one AU with TemporalId equal to 0 or provided through external means.

All VPS NAL units with a particular value of vps_video_parameter_set_id in a CVS shall have the same content.

vps_video_parameter_set_id provides an identifier for the VPS for reference by other syntax elements. The value of vps_video_parameter_set_id shall be greater than 0.

vps_max_layers_minus1 plus 1 specifies the maximum allowed number of layers in each CVS referring to the VPS.

vps_max_sublayers_minus1 plus 1 specifies the maximum number of temporal sublayers that may be present in each CVS referring to the VPS. The value of vps_max_sublayers_minus1 shall be in the range of 0 to 6, inclusive.

vps_all_layers_same_num_sublayers_flag equal to 1 specifies that the number of temporal sublayers is the same for all the layers in each CVS referring to the VPS. vps_all_layers_same_num_sublayers_flag equal to 0 specifies that the layers in each CVS referring to the VPS may or may not have the same number of temporal sublayers. When not present, the value of vps_all_layers_same_num_sublayers_flag is inferred to be equal to 1.

vps_all_independent_layers_flag equal to 1 specifies that all layers in the CVS are independently coded without using inter-layer prediction. vps_all_independent_layers_flag equal to 0 specifies that one or more of the layers in the CVS may use inter-layer prediction. When not present, the value of vps_all_independent_layers_flag is inferred to be equal to 1. When vps_all_independent_layers_flag is equal to 1, the value of vps_independent_layer_flag[i] is inferred to be equal to 1. When vps_all_independent_layers_flag is equal to 0, the value of vps_independent_layer_flag[0] is inferred to be equal to 1.

vps_layer_id[i] specifies the nuh_layer_id value of the i-th layer. For any two non-negative integer values of m and n, when m is less than n, the value of vps_layer_id[m] shall be less than vps_layer_id[n].

vps_independent_layer_flag[i] equal to 1 specifies that the layer with index i does not use inter-layer prediction. vps_independent_layer_flag[i] equal to 0 specifies that the layer with index i may use inter-layer prediction and the syntax elements vps_direct_ref_layer_flag[i][j] for j in the range of 0 to i−1, inclusive, are present in VPS. When not present, the value of vps_independent_layer_flag[i] is inferred to be equal to 1.

vps_direct_ref_layer_flag[i][j] equal to 0 specifies that the layer with index j is not a direct reference layer for the layer with index i. vps_direct_ref_layer_flag[i][j] equal to 1 specifies that the layer with index j is a direct reference layer for the layer with index i. When vps_direct_ref_layer_flag[i][j] is not present for i and j in the range of 0 to vps_max_layers_minus1, inclusive, it is inferred to be equal to 0. When vps_independent_layer_flag[i] is equal to 0, there shall be at least one value of j in the range of 0 to i−1, inclusive, such that the value of vps_direct_ref_layer_flag[i][j] is equal to 1. The variables NumDirectRefLayers[i], DirectRefLayerIdx[i][d], NumRefLayers[i], RefLayerIdx[i][r], and LayerUsedAsRefLayerFlag[j] are derived as follows:

```
for( i = 0; i <= vps_max_layers_minus1; i++ )
    for( j = 0; j <= vps_max_layers_minus1; j++ ) {
        dependencyFlag[ i ][ j ] = vps_direct_ref_layer_flag[ i ][ j ]
        for( k = 0; k < i; k++ )
            if( vps_direct_ref_layer_flag[ i ][ k ] && dependencyFlag[ k ][ j ] )
                dependencyFlag[ i ][ j ] = 1
    }
for( i = 0; i <= vps_max_layers_minus1; i++ ) {
    LayerUsedAsRefLayerFlag[ j ] = 0
    for( j = 0, d = 0, r = 0; j <= vps_max_layers_minus1; j++ ) {       (37)
        if( direct_ref_layer_flag[ i ][ j ] ) {
            DirectRefLayerIdx[ i ][ d++ ] = j
            LayerUsedAsRefLayerFlag[ j ] = 1
        }
        if( dependencyFlag[ i ][ j ] )
            RefLayerIdx[ i ][ r++ ] = j
    }
    NumDirectRefLayers[ i ] = d
    NumRefLayers[ i ] = r
}
```

The variable GeneralLayerIdx[i], specifying the layer index of the layer with nuh_layer_id equal to vps_layer_id[i], is derived as follows:

```
for( i = 0; i <= vps_max_layers_minus1; i++ )       (38)
    GeneralLayerIdx[ vps_layer_id[ i ] ] = i
``` each_layer_is_an_ols_flag equal to 1 specifies that each output layer set contains only one layer and each layer itself in the bitstream is an output layer set with the single included layer being the only output layer. each_layer_is_an_ols_flag equal to 0 that an output layer set may contain more than one layer. If vps_max_layers_minus1 is equal to 0, the value of the value of each_layer_is_an_ols_flag is inferred to be equal to 1. Otherwise, when vps_all_independent_layers_flag is equal to 0, the value of each_layer_is_an_ols_flag is inferred to be equal to 0.

ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is output.

ols_mode_idc equal to 1 specifies that the total number of OLSs specified by the VPS is equal to vps_max_layers_minus1+1, the i-th OLS includes the layers with layer indices from 0 to i, inclusive, and for each OLS all layers in the OLS are output.

ols_mode_idc equal to 2 specifies that the total number of OLSs specified by the VPS is explicitly signalled and for each OLS the output layers are explicitly signalled and other layers are the layers that are direct or indirect refernece layers of the output layers of the OLS.

The value of ols_mode_idc shall be in the range of 0 to 2, inclusive. The value 3 of ols_mode_idc is reserved for future use by ITU-T|ISO/IEC.

When vps_all_independent_layers_flag is equal to 1 and each_layer_is_an_ols_flag is equal to 0, the value of ols_mode_idc is inferred to be equal to 2.

num_output_layer_sets_minus1 plus 1 specifies the total number of OLSs specified by the VPS when ols_mode_idc is equal to 2.

The variable TotalNumOlss, specifying the total number of OLSs specified by the VPS, is derived as follows:

```
if( vps_max_layers_minus1 == 0 )
   TotalNumOlss = 1
else if( each_layer_is_an_ols_flag | | ols_mode_idc == 0 | | ols_mode_idc == 1 )
   TotalNumOlss = vps_max_layers_minus1 + 1                                  (39)
else if( ols_mode_idc == 2 )
   TotalNumOlss = num_output_layer_sets_minus1 + 1
``` ols_output_layer_flag[i][j] equal to 1 specifies that the layer with nuh_layer_id equal to vps_layer_id[j] is an output layer of the i-th OLS when ols_mode_idc is equal to 2. ols_output_layer_flag[i][j] equal to 0 specifies that the layer with nuh_layer_id equal to vps_layer_id[j] is not an output layer of the i-th OLS when ols_mode_idc is equal to 2.
The variable NumOutputLayersInOls[i], specifying the number of output layers in the i-th OLS, and the variable OutputLayerIdInOls[i][j], specifying the nuh_layer_id value of the j-th output layer in the i-th OLS, are derived as follows:

```
NumOutputLayersInOls[ 0 ] = 1
OutputLayerIdInOls[ 0 ][ 0 ] = vps_layer_id[ 0 ]
for( i = 1; i < TotalNumOlss; i++ ) {
   if( each_layer_is_an_ols_flag | | ols_mode_idc == 0 ) {
      NumOutputLayersInOls[ i ] = 1
      OutputLayerIdInOls[ i ][ 0 ] = vps_layer_id[ i ]
   } else if( ols_mode_idc == 1 ) {
      NumOutputLayersInOls[ i ] = i + 1
      for( j = 0; j < NumOutputLayersInOls[ i ]; j++ )
         OutputLayerIdInOls[ i ][ j ] = vps_layer_id[ j ]
   } else if( ols_mode_idc == 2 ) {
      for( j = 0; j <= vps_max_layers_minus1; j++ )
         layerIncludedFlag[ i ][ j ] = 0
      for( k = 0, j = 0; k <= vps_max_layers_minus1; k++ )    (40)
         if( ols_output_layer_flag[ i ][ k ] ) {
            layerIncludedFlag[ i ][ j ] = 1
            OutputLayerIdx[ i ][ j ] = k
            OutputLayerIdInOls[ i ][ j++ ] = vps_layer_id[ k ]
         }
      NumOutputLayersInOls[ i ] = j
      for( j = 0; j < NumOutputLayersInOls[ i ]; j++ ) {
         idx = OutputLayerIdx[ i ][ j ]
         for( k = 0; k < NumRefLayers[ idx ]; k++ )
            layerIncludedFlag[ i ][ RefLayerIdx[ idx ][ k ] ] = 1
      }
   }
}
```

For each OLS, there shall be at least one layer that is an output layer. In other words, for any value of i in the range of 0 to TotalNumOlss−1, inclusive, the value of NumOutputLayersInOls[i] shall be greater than or equal to 1.
The variable NumLayersInOls[i], specifying the number of layers in the i-th OLS, and the variable LayerIdInOls[i][j], specifying the nuh_layer_id value of the j-th layer in the i-th OLS, are derived as follows:

```
NumLayersInOls[ 0 ] = 1
LayerIdInOls[ 0 ][ 0 ] = vps_layer_id[ 0 ]
for( i = 1; i < TotalNumOlss; i++ ) {
   if( each_layer_is_an_ols_flag ) {
      NumLayersInOls[ i ] = 1
      LayerIdInOls[ i ][ 0 ] = vps_layer_id[ i ]
      (41)
   } else if( ols_mode_idc == 0 | | ols_mode_idc == 1 ) {
      NumLayersInOls[ i ] = i + 1
      for( j = 0; j < NumLayersInOls[ i ]; j++ )
         LayerIdInOls[ i ][ j ] = vps_layer_id[ j ]
   } else if( ols_mode_idc == 2 ) {
      for( k = 0, j = 0; k <= vps_max_layers_minus1; k++ )
         if( layerIncludedFlag[ i ][ k ] )
            LayerIdInOls[ i ][ j++ ] = vps_layer_id[ k ]
      NumLayersInOls[ i ] = j
   }
}
```

NOTE 1—The 0-th OLS contains only the lowest layer (i.e., the layer with nuh_layer_id equal to vps_layer_id[0]) and for the 0-th OLS the only included layer is output.
The variable OlsLayeIdx[i][j], specifying the OLS layer index of the layer with nuh_layer_id equal to LayerIdInOls[i][j], is derived as follows:

```
for( i = 0; i < TotalNumOlss; i++ )
   for j = 0; j < NumLayersInOls[ i ]; j++ )       (42)
      OlsLayeIdx[ i ][ LayerIdInOls[ i ][ j ] ] = j
```

The lowest layer in each OLS shall be an independent layer. In other words, for each i in the range of 0 to TotalNumOlss−1, inclusive, the value of vps_independent_layer_flag[GeneralLayerIdx[LayerIdInOls[i][0]]] shall be equal to 1.
Each layer shall be included in at least one OLS specified by the VPS. In other words, for each layer with a particular value of nuh_layer_id_nuhLayerId, equal to one of vps_layer_id[k] for k in the range of 0 to vps_max_layers_minus1, inclusive, there shall be at least one pair of values of i and j, where i is in the range of 0 to TotalNumOlss−1, inclusive, and j is in the range ofNumLayersInOls[i]−1, inclusive, such that the value of LayerIdInOls[i][j] is equal to nuhLayerId.
vps_num_ptls specifies the number of profile_tier_level( ) syntax structures in the VPS.
pt_present_flag[i] equal to 1 specifies that profile, tier, and general constraints information are present in the i-th profile_tier_level( ) syntax structure in the VPS. pt_present_flag[i] equal to 0 specifies that profile, tier, and general constraints information are not present in the i-th profile_tier_level( ) syntax structure in the VPS. The value of pt_present_flag[0] is inferred to be equal to 0. When pt_present_flag[i] is equal to 0, the profile, tier, and general constraints information for the i-th profile_tier_level( ) syntax structure in the VPS are inferred to be the same as that for the (i−1)-th profile_tier_level( ) syntax structure in the VPS.
ptl_max_temporal_id[i] specifies the TemporalId of the highest sublayer representation for which the level information is present in the i-th profile_tier_level( ) syntax structure in the VPS. The value of ptl_max_temporal_id[i] shall be in the range of 0 to vps_max_sublayers_minus1, inclusive. When vps_max_sublayers_minus1 is equal to 0, the value of ptl_max_temporal_id[i] is inferred to be equal to 0. When vps_max_sublayers_minus1 is greater than 0 and vps_all_layers_same_num_sublayers_flag is equal to 1, the value of ptl_max_temporal_id[i] is inferred to be equal to vps_max_sublayers_minus1.
vps_ptl_byte_alignment_zero_bit shall be equal to 0.

ols_ptl_idx[i] specifies the index, to the list of profile_tier_level( ) syntax structures in the VPS, of the profile_tier_level( ) syntax structure that applies to the i-th OLS. When present, the value of ols_ptl_idx[i] shall be in the range of 0 to vps_num_ptls−1, inclusive.

When NumLayersInOls[i] is equal to 1, the profile_tier_level( ) syntax structure that applies to the i-th OLS is present in the SPS referred to by the layer in the i-th OLS.

vps_num_dpb_params specifies the number of dpb_parameters( ) syntax structures in the VPS. The value of vps_num_dpb_params shall be in the range of 0 to 16, inclusive. When not present, the value of vps_num_dpb_params is inferred to be equal to 0.

same_dpb_size_output_or_nonoutput_flag equal to 1 specifies that there is no layer_nonoutput_dpb_params_idx[i] syntax element present in the VPS. same_dpb_size_output_or_nonoutput_flag equal to 0 specifies that there may or may not be layer_nonoutput_dpb_params_idx[i] syntax elements present in the VPS.

vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax structures in the VPS. When not present, vps_sub_dpb_params_info_present_flag is inferred to be equal to 0.

dpb_size_only_flag[i] equal to 1 specifies that the max_num_reorder_pics[ ] and max_latency_increase_plus1[ ] syntax elements are not present in the i-th dpb_parameters( ) syntax structures the VPS. dpb_size_only_flag[i] equal to 1 specifies that the max_num_reorder_pics[ ] and max_latency_increase_plus1[ ] syntax elements may be present in the i-th dpb_parameters( ) syntax structures the VPS.

dpb_max_temporal_id[i] specifies the TemporalId of the highest sublayer representation for which the DPB parameters may be present in the i-th dpb_parameters( ) syntax structure in the VPS. The value of dpb_max_temporal_id[i] shall be in the range of 0 to vps_max_sublayers_minus1, inclusive. When vps_max_sublayers_minus1 is equal to 0, the value of dpb_max_temporal_id[i] is inferred to be equal to 0. When vps_max_sublayers_minus1 is greater than 0 and vps_all_layers_same_num_sublayers_flag is equal to 1, the value of dpb_max_temporal_id[i] is inferred to be equal to vps_max_sublayers_minus1.

layer_output_dpb_params_idx[i] specifies the index, to the list of dpb_parameters( ) syntax structures in the VPS, of the dpb_parameters( ) syntax structure that applies to the i-th layer when it is an output layer in an OLS. When present, the value of layer_output_dpb_params_idx[i] shall be in the range of 0 to vps_num_dpb_params−1, inclusive.

If vps_independent_layer_flag[i] is equal to 1, the dpb_parameters( ) syntax structure that applies to the i-th layer when it is an output layer is the dpb_parameters( ) syntax structure present in the SPS referred to by the layer.

Otherwise (vps_independent_layer_flag[i] is equal to 0), the following applies:
  When vps_num_dpb_params is equal to 1, the value of layer_output_dpb_params_idx[i] is inferred to be equal to 0.
  It is a requirement of bitstream conformance that the value of layer_output_dpb_params_idx[i] shall be such that dpb_size_only_flag[layer_output_dpb_params_idx[i]] is equal to 0.

layer_nonoutput_dpb_params_idx[i] specifies the index, to the list of dpb_parameters( ) syntax structures in the VPS, of the dpb_parameters( ) syntax structure that applies to the i-th layer when it is a non-output layer in an OLS. When present, the value of layer_nonoutput_dpb_params_idx[i] shall be in the range of 0 to vps_num_dpb_params−1, inclusive.

If same_dpb_size_output_or_nonoutput_flag is equal to 1, the following applies:
  If vps_independent_layer_flag[i] is equal to 1, the dpb_parameters( ) syntax structure that applies to the i-th layer when it is a non-output layer is the dpb_parameters( ) syntax structure present in the SPS referred to by the layer.
  Otherwise (vps_independent_layer_flag[i] is equal to 0), the value of layer_nonoutput_dpb_params_idx[i] is inferred to be equal to layer_output_dpb_params_idx[i].

Otherwise (same_dpb_size_output_or_nonoutput_flag is equal to 0), when vps_num_dpb_params is equal to 1, the value of layer_output_dpb_params_idx[i] is inferred to be equal to 0.

vps_general_hrd_params_present_flag equal to 1 specifies that the syntax structure general_hrd_parameters( ) and other HRD parameters are present in the VPS RBSP syntax structure. vps_general_hrd_params_present_flag equal to 0 specifies that the syntax structure general_hrd_parameters( ) and other HRD parameters are not present in the VPS RBSP syntax structure.

vps_sublayer_cpb_params_present_flag equal to 1 specifies that the i-th ols_hrd_parameters( ) syntax structure in the VPS contains HRD parameters for the sublayer representations with TemporalId in the range of 0 to hrd_max_tid[i], inclusive. vps_sublayer_cpb_params_present_flag equal to 0 specifies that the i-th ols_hrd_parameters( ) syntax structure in the VPS contains HRD parameters for the sublayer representation with TemporalId equal to hrd_max_tid[i] only. When vps_max_sublayers_minus1 is equal to 0, the value of vps_sublayer_cpb_params_present_flag is inferred to be equal to 0.

When vps_sublayer_cpb_params_present_flag is equal to 0, the HRD parameters for the sublayer representations with TemporalId in the range of 0 to hrd_max_tid[i−1], inclusive, are inferred to be the same as that for the sublayer representation with TemporalId equal to hrd_max_tid[i]. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_hrd_parameters syntax structure.

num_ols_hrd_params_minus1 plus 1 specifies the number of ols_hrd_parameters( ) syntax structures present in the general_hrd_parameters( ) syntax structure. The value of num_ols_hrd_params_minus1 shall be in the range of 0 to 63, inclusive. When TotalNumOlss is greater than 1, the value of num_ols_hrd_params_minus1 is inferred to be equal to 0.

hrd_max_tid[i] specifies the TemporalId of the highest sublayer representation for which the HRD parameters are contained in the i-th ols_hrd_parameters( ) syntax structure. The value of hrd_max_tid[i] shall be in the range of 0 to vps_max_sublayers_minus1, inclusive. When vps_max_sublayers_minus1 is equal to 0, the value of hrd_max_tid[i] is inferred to be equal to 0.

ols_hrd_idx[i] specifies the index of the ols_hrd_parameters( ) syntax structure that applies to the i-th OLS. The value of ols_hrd_idx[[i] shall be in the range of 0 to num_ols_hrd_params_minus1, inclusive. When not present, the value of ols_hrd_idx[[i] is inferred to be equal to 0.

vps_extension_flag equal to 0 specifies that no vps_extension_data_flag syntax elements are present in the VPS RBSP syntax structure. vps_extension_flag equal to 1 specifies that there are vps_extension_data_flag syntax elements present in the VPS RBSP syntax structure.

vps_extension_data_flag may have any value. Its presence and value do not affect decoder conformance to profiles specified in this version of this Specification. Decoders conforming to this version of this Specification shall ignore all vps_extension_data_flag syntax elements.

3.4. SPS Syntax and Semantics in VVC

In the latest VVC draft text in WET-P2001-v14, the SPS syntax and semantics that are most relevant to the inventions herein are as as follows.

7.3.2.3 Sequence Parameter Set RBSP Syntax

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) |  |
|     profile_tier_level( 1, sps_max_sublayers_minus1 ) |  |
|   ... |  |

7.4.3.3 Sequence Parameter Set RBSP Semantics

An SPS RBSP shall be available to the decoding process prior to it being referenced, included in at least one AU with TemporalId equal to 0 or provided through external means. All SPS NAL units with a particular value of sps_seq_parameter_set_id in a CVS shall have the same content.

sps_decoding_parameter_set_id, when greater than 0, specifies the value of dps_decoding_parameter_set_id for the DPS referred to by the SP S. When sps_decoding_parameter_set_id is equal to 0, the SPS does not refer to a DPS and no DPS is referred to when decoding each CLVS referring to the SPS. The value of sps_decoding_parameter_set_id shall be the same in all SPSs that are referred to by coded pictures in a bitstream.

sps_video_parameter_set_id, when greater than 0, specifies the value of vps_video_parameter_set_id for the VPS referred to by the SPS.

When sps_video_parameter_set_id is equal to 0, the following applies:
  The SPS does not refer to a VPS.
  No VPS is referred to when decoding each CLVS referring to the SPS.
  The value of vps_max_layers_minus1 is inferred to be equal to 0.
  The CVS shall contain only one layer (i.e., all VCL NAL unit in the CVS shall have the same value of nuh_layer_id).
  The value of GeneralLayerIdx[nuh_layer_id] is inferred to be equal to 0.
  The value of vps_independent_layer_flag[GeneralLayerIdx[nuh_layer_id]] is inferred to be equal to 1.

When vps_independent_layer_flag[GeneralLayerIdx[nuh_layer_id]] is equal to 1, the SPS referred to by a CLVS with a particluar nuh_layer_id value nuhLayerId shall have nuh_layer_id equal to nuhLayerId.

sps_max_sublayers_minus1 plus 1 specifies the maximum number of temporal sublayers that may be present in each CLVS referring to the SPS. The value of sps_max_sublayers_minus1 shall be in the range of 0 to vps_max_sublayers_minus1, inclusive.

sps_reserved_zero_4 bits shall be equal to 0 in bitstreams conforming to this version of this Specification. Other values for sps_reserved_zero_4 bits are reserved for future use by ITU-T|ISO/IEC.

sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these syntax structures is present in the SPS. The value of sps_ptl_dpb_hrd_params_present_flag shall be equal to vps_independent_layer_flag[nuh_layer_id].

If vps_independent_layer_flag[GeneralLayerIdx[nuh_layer_id]] is equal equal to 1, the variable MaxDecPicBuffMinus1 is set equal to max_dec_pic_buffering_minus1[sps_max_sublayers_minus1] in the dpb_parameters( ) syntax structure in the SPS. Otherwise, MaxDecPicBuffMinus1 is set equal to max_dec_pic_buffering_minus1[sps_max_sublayers_minus1] in the layer_nonoutput_dpb_params_idx[GeneralLayerIdx[nuh_layer_id]]-th dpb_parameters( ) syntax structure in the VPS.

. . .

3.5. Slice Header Syntax and Semantics in VVC

In the latest VVC draft text in JVET-P2001-v14, the slice header syntax and semantics that are most relevant to the inventions herein are as as follows.

7.3.7.1 General Slice Header Syntax

|  | Descriptor |
|---|---|
| slice_header( ) { |  |
|   slice_pic_order_cnt_lsb | u(v) |
|   if( subpics_present_flag ) |  |
|     slice_subpic_id | u(v) |
|   if( rect_slice_flag \|\| Num TilesInPic > 1 ) |  |
|     slice_address | u(v) |
|   if( !rect_slice_flag && Num TilesInPic > 1 ) |  |
|     num_tiles_in_slice_minus1 | ue(v) |
|   slice_type | ue(v) |
| ... |  |

7.4.8.1 General Slice Header Semantics

. . .

slice_type specifies the coding type of the slice according to Table 9.

TABLE 9

| Name association to slice_type | |
|---|---|
| slice_type | Name of slice_type |
| 0 | B (B slice) |
| 1 | P (P slice) |
| 2 | I (I slice) |

When nal_unit_type is a value of nal_unit_type in the range of IDR_W_RADL to CRA_NUT, inclusive, and the current picture is the first picture in an access unit, slice type shall be equal to 2.

. . .

4. Technical Problems Solved by Described Technical Solutions

The existing scalability design in VVC has the following problems:
1) The latest VVC draft text includes the following constraint on slice_type:
  When nal_unit_type is a value of nal_unit_type in the range of IDR_W_RADL to CRA_NUT, inclusive, and the current picture is the first picture in an AU, slice type shall be equal to 2.

The value of slice type equal to 2 for a slice means that the slice is intra coded without using inter prediction from a reference picture.

However, in an AU, not only the first picture that is in the AU and that is an TRAP picture needs to contain intra-coded slices only, but also all the TRAP pictures in all the independent layers need to contain intra-coded slices only. Therefore, the above constraint does needs to be updated.

2) When the syntax element ols_ptl_idx[i] is not present, the value still needs to be used.

However, there lacks an inference of the value of ols_ptl_idx[i] when it is not present.

3) The signalling of the syntax element layer_output_dpb_params_idx[i] is unnecessary when the i-layer is not used as an output layer in any of the OLSs.

4) The value of the syntax element vps_num_dpb_params can be equal to 0. However, there needs to be at least one dpb_parameters( ) syntax structure in the VPS when vps_all_independent_layers_flag is equal to 0.

5) In the latest VVC draft text, the PTL information for OLSs containing only one layer, such a layer is an independently coded layer without referring to any other layer, is only signalled in the SPS. However, it would be desirable to signal the PTL information for all OLSs in a bitstream in the VPS for session negotiation purposes.

6) The vps_ptl_byte_alignment_zero bit syntax element is unnecessarily signalled when the number of PTL syntax structures signalled in the VPS is zero.

7) In the semantics of sps_video_parameter_set_id, there is the following constraint:

When sps_video_parameter_set_id is equal to 0, the CVS shall contain only one layer (i.e., all VCL NAL unit in the CVS shall have the same value of nuh_layer_id).

However, this constraint disallows an independent layer that does not refer to a VPS to be included in a multi-layer bitstream. As sps_video_parameter_set_id equal to 0 means that the SPS (and the layer) does not refer to a VPS.

8) The value of vps_general_hrd_params_present_flag can be equal to 1 when each_layer_is_an_ols_flag is equal to 1. However, when each_layer_is_an_ols_flag is equal to 1, the HRD parameters are only signalled in the SPSs, therefore the value of vps_general_hrd_params_present_flag shall not be equal to 1. In some cases, it may not make sense to signal the general_hrd_parameter( ) syntax structure while signaling zero old_hrd_parameters( ) syntax structures in the VPS.

9) The HRD parameters for OLSs containing only one layer are signalled in both the VPS and the SPSs. However, it is not useful to repeat the HRD parameters in the VPS for OLSs containing only one layer.

5. Example Embodiments and Techniques

To solve the above problems, and others, methods as summarized below are disclosed. The inventions should be considered as examples to explain the general concepts and should not be interpreted in a narrow way. Furthermore, these inventions can be applied individually or combined in any manner.

1) To solve the first problem, the following constraint is specified:

When nal_unit_type is in the range of IDR_W_RADL to CRA_NUT, inclusive, and vps_independent_layer_flag[GeneralLayerIdx[nuh_layer_id]] is equal to 1, slice type shall be equal to 2.

2) To solve the second problem, for each value of possible value of i, the value of ols_ptl_idx[i] is inferred to be equal to 0 when the syntax element is not present.

3) To solve the third problem, the variable LayerUsedAsOutputLayerFlag[i] is specified to indicate whether the i-layer is used as an output layer in whichever OLS, and when the variable is equal to 0, the signalling of the variable layer_output_dpb_params_idx[i] is avoided.

a. Furthermore, the following constraint may be additionally specified: For each value of i in the range of 0 to vps_max_layers_minus1, inclusive, the values of LayerUsedAsRefLayerFlag[i] and LayerUsedAsOutputLayerFlag[i] shall not be both equal to 0. In other words, there shall be no layer that is neither a direct reference layer of any other layer nor an output layer of at least one OLS.

4) To solve the fourth problem, change vps_num_dpb_params to vps_num_dpb_params_minus1, and specify VpsNumDpbParams as follows:

if(!vps_all_independent_layers_flag)

VpsNumDpbParams=vps_num_dpb_params_minus1+1 else

VpsNumDpbParams=0

And replace the use of vps_num_dpb_params in the syntax conditions and the semantics with VpsNumDpbParams.

a. Furthermore, the following constraint is additionally specified: When not present, the value of same_dpb_size_output_or_nonoutput_flag is inferred to be equal to 1.

5) To solve the fifth problem, allow repeating in the VPS the PTL information for OLSs containing only one layer for session negotiation purposes. This can be realized by changing vps_num_ptls to vps_num_ptls_minus1.

a. Alternatively, keep vps_num_ptls (without making it vps_num_ptls_minus1), but remove"NumLayersInOls[i]>1 &&" from the syntax condition for ols_ptl_idx[i].

a. Alternatively, keep vps_num_ptls (without making it vps_num_ptls_minus1), but condition vps_num_ptls on "if(!each_layer_is_an_ols_flag)", or "if(vps_max_layers_minus1>0 && !vps_all_independent_layers_flag".

b. Alternatively, also allow repeating the DPB parameters information (either just the DPB size or all DPB parameters) for OLSs containing only one layer in the VPS.

6) To solve the sixth problem, the vps_ptl_byte_alignment_zero bit syntax element is not signalled as long as the number of PTL syntax structures signalled in the VPS is zero. This can be realized by additionally conditioning vps_ptl_byte_alignment_zero bit on "if (vps_num_ptls>0)" or by changing vps_num_ptls to vps_num_ptls_minus1, which effectively disallows the number of PTL syntax structures signalled in the VPS to be equal to zero.

7) To solve the seventh problem, remove the following constraint:
   When sps_video_parameter_set_id is equal to 0, the CVS shall contain only one layer (i.e., all VCL NAL unit in the CVS shall have the same value of nuh_layer_id).
   And add the following constraint:
   The value of sps_video_parameter_set_id shall be the same in all SPSs that are referred to by coded pictures in a CVS and that have sps_video_parameter_set_id greater than 0.
   a. Alternatively, keep the following constraint:
      When sps_video_parameter_set_id is equal to 0, the CVS shall contain only one layer (i.e., all VCL NAL unit in the CVS shall have the same value of nuh_layer_id).
   And specify the following constraint:
      The value of sps_video_parameter_set_id shall be the same in all SPSs that are referred to by coded pictures in a CVS.
8) To solve the eighth problem, the syntax element vps_general_hrd_params_present_flag is not signalled when vps_general_hrd_params_present_flag is equal to 1, and when not present, the value of vps_general_hrd_params_present_flag is inferred to be equal to 0.
   a. Alternatively, the value of vps_general_hrd_params_present_flag is constrained to be equal to 0 when each_layer_is_an_ols_flag is equal to 1.
   b. Furthermore, the syntax condition for the syntax element num_ols_hrd_params_minus1, i.e., "if(TotalNumOlss>1)", is removed, as it is not needed. This is because when TotalNumOlss is equal to 1, the value of each_layer_is_an_ols_flag would be equal to 1 and then the value of vps_general_hrd_params_present_flag would equal to 0 then no HRD parameters would be signalled in the VPS at all.
   In some cases, when there is no ols_hrd_parameters( ) syntax structure is present in the VPS, the general_hrd_parameters( ) syntax structure is not signalled in the VPS.
9) To solve the ninth problem, the HRD parameters for OLSs containing only one layer are only signalled in SPSs, not in the VPS.

6. Embodiments

Below are some example embodiments for aspects summarized above in Section 5, which can be applied to the VVC specification. The changed texts are based on the latest VVC text in WET-P2001-v14. Most relevant parts that have been added or modified are highlighted in underline boldface, and some of the deleted parts are highlighted in italics boldface. There are some other changes that are editorial in nature and thus not highlighted.

6.1. First Embodiment 6.1.1. VPS Syntax and Semantics
7.3.2.2 Video Parameter Set Syntax

|  | Descriptor |
|---|---|
| video_parameter_set_rbsp( ) { |  |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) |  |
|     vps_all_layers_same_num_sublayers_flag | u(1) |
|   if( vps_max_layers_minus1 > 0 ) |  |
|     vps_all_independent_layers_flag | u(1) |
|   for( i = 0; i <= vps_max_layers_minus1; i++ ) { |  |
|     vps_layer_id[ i ] | u(6) |
|     if( i > 0 && !vps_all_independent_layers_flag ) { |  |
|       vps_independent_layer_flag[ i ] | u(1) |
|       if( !vps_independent_layer_flag[ i ] ) |  |
|         for( j = 0; j <i; j++ ) |  |
|           vps_direct_ref_layer_flag[ i ][ j ] | u(1) |
|     } |  |
|   } |  |
|   if( vps_max_layers_minus1 > 0 ) { |  |
|     if( vps_all_independent_layers_flag ) |  |
|       each_layer_is_an_ols_flag | u(1) |
|     if( !each_layer_is_an_ols_flag ) { |  |
|       if( !vps_all_independent_layers_flag ) |  |
|         ols_mode_idc | u(2) |
|       if( ols_mode_idc == 2 ) { |  |
|         num_output_layer_sets_minus1 | u(8) |
|         for( i = 1; i <= num_output_layer_sets_minus1; i ++) |  |
|           for( j = 0; j <= vps_max_layers_minus1; j++ ) |  |
|             ols_output_layer_flag[ i ][ j ] | u(1) |
|       } |  |
|     } |  |
|   } |  |
|   vps_num_ptls_minus1 | u(8) |
|   for( i = 0; i <= vps_num_ptls_minus1; i++ ) { |  |
|     if( i > 0 ) |  |
|       pt_present_flag[ i ] | u(1) |
|     if( vps_max_sublayers_minus1 > 0 && !vps_all_layers_same_num_sublayers_flag ) |  |
|       ptl_max_temporal_id[ i ] | u(3) |
|   } |  |

-continued

| | Descriptor |
|---|---|
| ```
while( !byte_aligned( ) )
   vps_ptl_byte_alignment_zero_bit /* equal to 0 */
for( i = 0; i <= vps_num_ptls minus1; i++ )
   profile_tier_level( pt_present_flag[ i ], ptl_max_temporal_id[ i ] )
for( i = 0; i < TotalNumOlss; i++ )
   if( vps_num_ptls_minus1 > 0 )
      ols_ptl_idx[ i ]
if( !vps_all_independent_layers_flag ) {
   vps_num_dpb_params_minus1
   same_dpb_size_output_or_nonoutput_flag
   if( vps_max_sublayers_minus1 > 0 )
      vps_sublayer_dpb_params_present_flag
}
for( i = 0; i < VpsNumDpbParams; i++ ) {
   dpb_size_only_flag[ i ]
   if( vps_max_sublayers_minus1 > 0 &&
!vps_all_layers_same_num_sublayers_flag )
      dpb_max_temporal_id[ i ]
   dpb_parameters( dpb_size_only_flag[ i ], dpb_max_temporal_id[ i ],
           vps_sublayer_dpb_params_present_flag )
}
for( i = 0; i < vps_max_layers_minus1 && VpsNumDpbParams > 1; i++ ) {
   if( LayerUsedAsOutputLayerFlag[ i ] && !vps_independent_layer_
flag[ i ] )
      layer_output_dpb_params_idx[ i ]
   if( LayerUsedAsRefLayerFlag[ i ] &&
!same_dpb_size_output_or_nonoutput_flag )
      layer_nonoutput_dpb_params_idx[ i ]
}
if( !each_layer_is_an_ols_flag )
   vps_general_hrd_params_present_flag
if( vps_general_hrd_params_present_flag ) {
   general_hrd_parameters( )
   if( vps_max_sublayers_minus1 > 0 )
      vps_sublayer_cpb_params_present_flag
   if( TotalNumOlss> 1)
   num_ols_hrd_params_minus1
   for( i = 0; i <= num_ols_hrd_params_minus1; i++ ) {
      if( vps_max_sublayers_minus1 > 0 &&
!vps_all_layers_same_num_sublayers_flag )
         hrd_max_tid[ i ]
      firstSubLayer = vps_sublayer_cpb_params_present_flag ? 0 :
         hrd_max_tid[ i ]
      ols_hrd_parameters( firstSubLayer, hrd_max_tid[ i ] )
   }
   if(num_ols_hrd_params_minus1 > 0 )
   for( i = 1; i < TotalNumOlss && NumLayersInOls[ i ] > 1; i++ )
      ols_hrd_idx[ i ]
}
vps_extension_flag
if( vps_extension_flag )
   while( more_rbsp_data( ) )
      vps_extension_data_flag
rbsp_trailing_bits( )
}
``` | u(1)<br><br><br><br><br>u(8)<br><br>ue(v)<br>u(1)<br><br>u(1)<br><br><br>u(1)<br><br><br>u(3)<br><br><br><br><br><br>ue(v)<br><br><br>ue(v)<br><br><br>u(1)<br><br><br><br>u(1)<br><br>ue(v)<br><br><br><br>u(3)<br><br><br><br><br><br>ue(v)<br><br>u(1)<br><br><br>u(1) |

7.4.3.2 Video Parameter Set RBSP Semantics ols_output_layer_flag[i][j] equal to 1 specifies that the layer with nuh_layer_id equal to vps_layer_id[j] is an output layer of the i-th OLS when ols_mode_idc is equal to 2. ols_output_layer_flag[i][j] equal to 0 specifies that the layer with nuh_layer_id equal to vps_layer_id[j] is not an output layer of the i-th OLS when ols_mode_idc is equal to 2.

The variable NumOutputLayersInOls[i], specifying the number of output layers in the i-th OLS, and the variable OutputLayerIdInOls[i][j], specifying the nuh_layer_id value of the j-th output layer in the i-th OLS, are derived as follows:

```
NumOutputLayersInOls[ 0 ] = 1
OutputLayerIdInOls[ 0 ][ 0 ] = vps_layer_id[ 0 ]
```

-continued

```
LayerUsedAsOutputLayerFlag[ 0 ] = 1
for( i = 1, i <= vps_max_layers_minus1; i++ ) {
   if( each_layer_is_an_ols_flag || ols_mode_idc < 2 )
      LayerUsedAsOutputLayerFlag[ i ] = 1
   if( ols_mode_idc == 2 )
      LayerUsedAsOutputLayerFlag[ i ] = 0
}
for( i = 1; i < TotalNumOlss; i++ ) {
   if( each_layer_is_an_ols_flag || ols_mode_idc == 0 ) {
      NumOutputLayersInOls[ i ] = 1
      OutputLayerIdInOls[ i ][ 0 ] = vps_layer_id[ i ]
   } else if( ols_mode_idc == 1 ) {
      NumOutputLayersInOls[ i ] = i + 1
```

-continued

```
    for( j = 0; j < NumOutputLayersInOls[ i ]; j++ )
      OutputLayerIdInOls[ i ][ j ] = vps_layer_id[ j ]
  } else if( ols_mode_idc == 2 ) {
    for( j = 0; j <= vps_max_layers_minus1; j++ )
      layerIncludedInOlsFlag[ i ][ j ] = 0
    for( k = 0, j = 0; k <= vps_max_layers_minus1; k++ )      (40)
      if( ols_output_layer_flag[ i ][ k ] ) {
        layerIncludedInOlsFlag[ i ][ k ] = 1
        LayerUsedAsOutputLayerFlag[ k ] = 1
        OutputLayerIdx[ i ][ j ] = k
        OutputLayerIdInOls[ i ][ j++ ] = vps_layer_id[ k ]
      }
    NumOutputLayersInOls[ i ] = j
    for( j = 0; j < NumOutputLayersInOls[ i ]; j++ ) {
      idx = OutputLayerIdx[ i ][ j ]
      for( k = 0; k < NumRefLayers[ idx ]; k++ )
        layerIncludedInOlsFlag[ i ][ RefLayerIdx[ idx ][ k ] ] = 1
    }
  }
}
```

For each value of i in the range of 0 to vps_max_layers_minus1, inclusive, the values of LayerUsedAsRefLayerFlag[i] and LayerUsedAsOutputLayerFlag[i] shall not be both equal to 0. In other words, there shall be no layer that is neither a a direct reference layer of any other layer nor an output layer of at least one OLS.

For each OLS, there shall be at least one layer that is an output layer. In other words, for any value of i in the range of 0 to TotalNumOlss−1, inclusive, the value of NumOutputLayersInOls[i] shall be greater than or equal to 1.

The variable NumLayersInOls[i], specifying the number of layers in the i-th OLS, and the variable LayerIdInOls[i][j], specifying the nuh_layer_id value of the j-th layer in the i-th OLS, are derived as follows:

```
    NumLayersInOls[ 0 ] = 1
    LayerIdInOls[ 0 ][ 0 ] = vps_layer_id[ 0 ]
    for( i = 1; i < TotalNumOlss; i++ ) {
      if( each_layer_is_an_ols_flag ) {
        NumLayersInOls[ i ] = 1
        LayerIdInOls[ i ][ 0 ] = vps_layer_id[ i ]
          (41)
      } else if( ols_mode_idc == 0 || ols_mode_idc == 1 ) {
        NumLayersInOls[ i ] = i + 1
        for( j = 0; j < NumLayersInOls[ i ]; j++ )
          LayerIdInOls[ i ][ j ] = vps_layer_id[ j ]
      } else if( ols_mode_idc == 2 ) {
        for( k = 0, j = 0; k <= vps_max_layers_minus1; k++ )
          if( layerIncludedInOlsFlag[ i ][ k ] )
            LayerIdInOls[ i ][ j++ ] = vps_layer_id[ k ]
        NumLayersInOls[ i ] = j
      }
    }
```

NOTE—The 0-th OLS contains only the lowest layer (i.e., the layer with nuh_layer_id equal to vps_layer_id [0]) and for the 0-th OLS the only included layer is output.

The variable OlsLayeIdx[i][j], specifying the OLS layer index of the layer with nuh_layer_id equal to LayerIdInOls[i][j], is derived as follows:

```
    for( i = 0; i < TotalNumOlss; i++ )
      for j = 0; j < NumLayersInOls[ i ]; j++ )     (42)
        OlsLayeIdx[ i ][ LayerIdInOls[ i ][ j ] ] = j
```

The lowest layer in each OLS shall be an independent layer. In other words, for each i in the range of 0 to TotalNumOlss−1, inclusive, the value of vps_independent_layer_flag[GeneralLayerIdx[LayerIdInOls[i][0]]] shall be equal to 1.

Each layer shall be included in at least one OLS specified by the VPS. In other words, for each layer with a particular value of nuh_layer_id_nuhLayerId equal to one of vps_layer_id[k] for k in the range of 0 to vps_max_layers_minus1, inclusive, there shall be at least one pair of values of i and j, where i is in the range of 0 to TotalNumOlss−1, inclusive, and j is in the range of NumLayersInOls[i]−1, inclusive, such that the value of LayerIdInOls[i][j] is equal to nuhLayerId.

vps_num_ptls_minus1 plus 1 specifies the number of profile_tier_level( ) syntax structures in the VPS.

pt_present_flag[i] equal to 1 specifies that profile, tier, and general constraints information are present in the i-th profile_tier_level( ) syntax structure in the VPS. pt_present_flag[i] equal to 0 specifies that profile, tier, and general constraints information are not present in the i-th profile_tier_level( ) syntax structure in the VPS. The value of pt_present_flag[0] is inferred to be equal to 1. When pt_present_flag[i] is equal to 0, the profile, tier, and general constraints information for the i-th profile_tier_level( ) syntax structure in the VPS are inferred to be the same as that for the (i−1)-th profile_tier_level( ) syntax structure in the VPS.

ptl_max_temporal_id[i] specifies the TemporalId of the highest sublayer representation for which the level information is present in the i-th profile_tier_level( ) syntax structure in the VPS. The value of ptl_max_temporal_id[i] shall be in the range of 0 to vps_max_sublayers_minus1, inclusive. When vps_max_sublayers_minus1 is equal to 0, the value of ptl_max_temporal_id[i] is inferred to be equal to 0. When vps_max_sublayers_minus1 is greater than 0 and vps_all_layers_same_num_sublayers_flag is equal to 1, the value of ptl_max_temporal_id[i] is inferred to be equal to vps_max_sublayers_minus1.

vps_ptl_byte_alignment_zero_bit shall be equal to 0.

ols_ptl_idx[i] specifies the index, to the list of profile_tier_level( ) syntax structures in the VPS, of the profile_tier_level( ) syntax structure that applies to the i-th OLS. When present, the value of ols_ptl_idx[i] shall be in the range of 0 to vps_num_ptls_minus1, inclusive. When vps_num_ptls_minus1 is equal to 0, the value of ols_ptl_idx[i] is inferred to be equal to 0.

When NumLayersInOls[i] is equal to 1, the profile_tier_level( ) syntax structure that applies to the i-th OLS is also present in the SPS referred to by the layer in the i-th OLS.

vps_num_dpb_params_minus1 plus 1 specifies the number of dpb_parameters( ) syntax structures in the VPS. When present, the value of vps_num_dpb_params_minus1 shall be in the range of 0 to 15, inclusive. The variable VpsNumDpbParams is derived as follows:

```
    if( !vps_all_independent_layers_flag )
      VpsNumDpbParams = vps_num_dpb_params_minus1 + 1      (42)
    else
      VpsNumDpbParams = 0
``` same_dpb_size_output_or_nonoutput_flag equal to 1 specifies that there is no layer_nonoutput_dpb_params_idx[i] syntax element present in the VPS. same_dpb_size_output_or_nonoutput_flag equal to 0 specifies that there may or may not be layer_nonoutput_dpb_params_idx[i] syntax elements present in the VPS. When not present, the value of same_dpb_size_output_or_nonoutput_flag id inferred to be equal to 1.

vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax structures in the VPS. When not present, vps_sub_dpb_params_info_present_flag is inferred to be equal to 0.

dpb_size_only_flag[i] equal to 1 specifies that the max_num_reorder_pics[ ] and max_latency_increase_plus1[ ] syntax elements are not present in the i-th dpb_parameters( ) syntax structures the VPS. dpb_size_only_flag[i] equal to 0 specifies that the max_num_reorder_pics[ ] and max_latency_increase_plus1[ ] syntax elements may be present in the i-th dpb_parameters( ) syntax structures the VPS.

dpb_max_temporal_id[i] specifies the TemporalId of the highest sublayer representation for which the DPB parameters may be present in the i-th dpb_parameters( ) syntax structure in the VPS. The value of dpb_max_temporal_id[i] shall be in the range of 0 to vps_max_sublayers_minus1, inclusive. When vps_max_sublayers_minus1 is equal to 0, the value of dpb_max_temporal_id[i] is inferred to be equal to 0. When vps_max_sublayers_minus1 is greater than 0 and vps_all_layers_same_num_sublayers_flag is equal to 1, the value of dpb_max_temporal_id[i] is inferred to be equal to vps_max_sublayers_minus1.

layer_output_dpb_params_idx[i] specifies the index, to the list of dpb_parameters( ) syntax structures in the VPS, of the dpb_parameters( ) syntax structure that applies to the i-th layer when it is an output layer in an OLS. When present, the value of layer_output_dpb_params_idx[i] shall be in the range of 0 to VpsNumDpbParams−1, inclusive.

If vps_independent_layer_flag[i] is equal to 1, the dpb_parameters( ) syntax structure that applies to the i-th layer when it is an output layer is the dpb_parameters( ) syntax structure present in the SPS referred to by the layer.

Otherwise (vps_independent_layer_flag[i] is equal to 0), the following applies:
  When VpsNumDpbParams is equal to 1, the value of layer_output_dpb_params_idx[i] is inferred to be equal to 0.
  It is a requirement of bitstream conformance that the value of layer_output_dpb_params_idx[i] shall be such that dpb_size_only_flag[layer_output_dpb_params_idx[i]] is equal to 0.

layer_nonoutput_dpb_params_idx[i] specifies the index, to the list of dpb_parameters( ) syntax structures in the VPS, of the dpb_parameters( ) syntax structure that applies to the i-th layer when it is a non-output layer in an OLS. When present, the value of layer_nonoutput_dpb_params_idx[i] shall be in the range of 0 to VpsNumDpbParams−1, inclusive.

If same_dpb_size_output_or_nonoutput_flag is equal to 1, the following applies:
  If vps_independent_layer_flag[i] is equal to 1, the dpb_parameters( ) syntax structure that applies to the i-th layer when it is a non-output layer is the dpb_parameters( ) syntax structure present in the SPS referred to by the layer.
  Otherwise (vps_independent_layer_flag[i] is equal to 0), the value of layer_nonoutput_dpb_params_idx[i] is inferred to be equal to layer_output_dpb_params_idx[i].

Otherwise (same_dpb_size_output_or_nonoutput_flag is equal to 0), when VpsNumDpbParams is equal to 1, the value of layer_output_dpb_params_idx[i] is inferred to be equal to 0.

vps_general_hrd_params_present_flag equal to 1 specifies that the syntax structure general_hrd_parameters( ) and other HRD parameters are present in the VPS RBSP syntax structure. vps_general_hrd_params_present_flag equal to 0 specifies that the syntax structure general_hrd_parameters( ) and other HRD parameters are not present in the VPS RBSP syntax structure. When not present, the value of vps_general_hrd_params_present_flag is inferred to be equal to 0.

vps_sublayer_cpb_params_present_flag equal to 1 specifies that the i-th ols_hrd_parameters( ) syntax structure in the VPS contains HRD parameters for the sublayer representations with TemporalId in the range of 0 to hrd_max_tid[i], inclusive. vps_sublayer_cpb_params_present_flag equal to 0 specifies that the i-th ols_hrd_parameters( ) syntax structure in the VPS contains HRD parameters for the sublayer representation with TemporalId equal to hrd_max_tid[i] only. When vps_max_sublayers_minus1 is equal to 0, the value of vps_sublayer_cpb_params_present_flag is inferred to be equal to 0.

When vps_sublayer_cpb_params_present_flag is equal to 0, the HRD parameters for the sublayer representations with TemporalId in the range of 0 to hrd_max_tid[i]−1, inclusive, are inferred to be the same as that for the sublayer representation with TemporalId equal to hrd_max_tid[i]. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_hrd_parameters syntax structure.

num_ols_hrd_params_minus1 plus 1 specifies the number of ols_hrd_parameters( ) syntax structures present in the general_hrd_parameters( ) syntax structure when vps_general_hrd_params_present_flag is equal to 1. The value of num_ols_hrd_params_minus1 shall be in the range of 0 to 63, inclusive. When TotalNumOlss is equal to 1, the value of num_ols_hrd_params_minus1 is inferred to be equal to 0..

hrd_maxtid[i] specifies the TemporalId of the highest sublayer representation for which the HRD parameters are contained in the i-th ols_hrd_parameters( ) syntax structure. The value of hrd_max_tid[i] shall be in the range of 0 to vps_max_sublayers_minus1, inclusive. When vps_max_sublayers_minus1 is equal to 0, the value of hrd_max_tid[i] is inferred to be equal to 0. When vps_max_sublayers_minus1 is greater than 0 and vps_all_layers_same_num_sublayers_flag is equal to 1, the value of hrd_max_tid[i] is inferred to be equal to vps_max_sublayers_minus1.

ols_hrd_idx[i] specifies the index, to the list of ols_hrd_parameters( ) syntax structures in the VPS, of the ols_hrd_parameters( ) syntax structure that applies to the i-th OLS when NumLayersInOls[i] is greater than 1. When present, the value of ols_hrd_idx[[i] shall be in the range of 0 to num_ols_hrd_params_minus1, inclusive. When NumLayersInOls[i] is greater than 1 and num_ols_hrd_params_minus1 is equal to 0, the value of ols_hrd_idx[[i] is inferred to be equal to 0.

vps_extension_flag equal to 0 specifies that no vps_extension_data_flag syntax elements are present in the VPS RBSP syntax structure. vps_extension_flag equal to 1 specifies that there are vps_extension_data_flag syntax elements present in the VPS RBSP syntax structure.

vps_extension_data_flag may have any value. Its presence and value do not affect decoder conformance to profiles specified in this version of this Specification. Decoders conforming to this version of this Specification shall ignore all vps_extension_data_flag syntax elements.

6.1.2. SPS Semantics
7.4.3.3 Sequence Parameter Set RB SP Semantics
An SPS RB SP shall be available to the decoding process prior to it being referenced, included in at lea st one AU with TemporalId equal to 0 or provided through external means. All SPS NAL units with a particular value of sps_seq_parameter_set_id in a CVS shall have the same content.
sps_decoding_parameter_set_id, when greater than 0, specifies the value of dps_decoding_parameter_set_id for the DPS referred to by the SPS. When sps_decoding_parameter_set_id is equal to 0, the SPS does not refer to a DPS and no DPS is referred to when decoding each CLVS referring to the SPS. The value of sps_decoding_pammeter_set_id shall be the same in all SPSs that are referred to by coded pictures in a bitstream.
sps_video_parameter_set_id, when greater than 0, specifies the value of vps_video_pammeter_set_id for the VPS referred to by the SPS. The value of sps_video_parameter_set_id shall be the same in all SPSs that are referred to by coded pictures in a CVS and that have sps_video_parameter_set_id greater than 0.
When sps_video_parameter_set_id is equal to 0, the following applies:
  The SPS does not refer to a VPS.
  No VPS is referred to when decoding each CLVS referring to the SPS.
  The value of vps_max_layers_minus1 is inferred to be equal to 0.
  The CVS shall contain only one layer (i.e, all VCLNAL unit in the CVS shall have the same value of nuh_layer_id).
  The value of GeneralLayerIdx[nuh_layer_id] is inferred to be equal to 0.
  The value of vps_independent_layer_flag[GeneralLayerIdx[nuh_layer_id]] is inferred to be equal to 1.
When vps_independent_layer_flag[GeneralLayerIdx[nuh_layer_id]] is equal to 1, the SPS referred to by a CLVS with a particluar nuh_layer_id value nuhLayerId shall have nuh_layer_id equal to nuhLayerId.
6.1.3. Slice Header Semantics
7.4.8.1 General Slice Header Semantics
. . .
slice_type specifies the coding type of the slice according to Table 9.

TABLE 9

| Name association to slice_type | |
|---|---|
| slice_type | Name of slice_type |
| 0 | B (B slice) |
| 1 | P (P slice) |
| 2 | I (I slice) |

When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g, 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
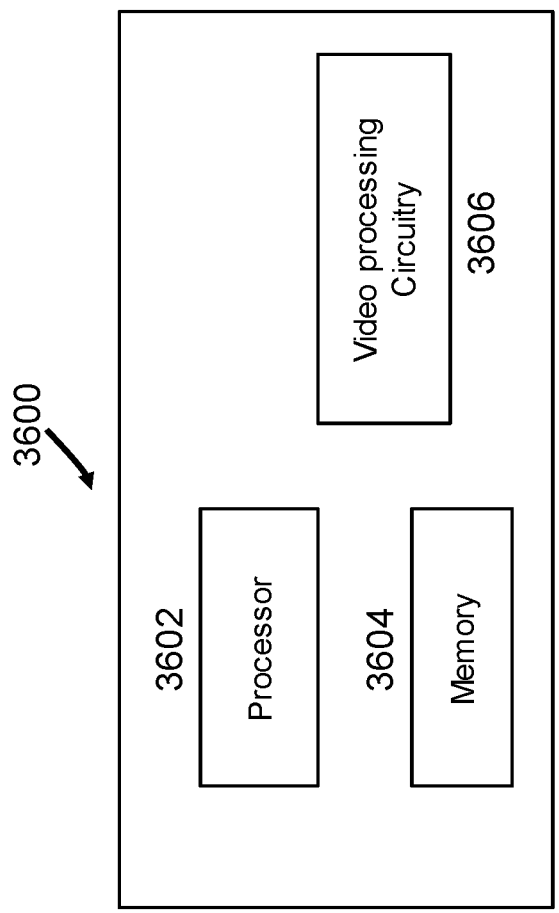
FIG. 2 is a block diagram of an example hardware platform used for video processing.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document. In some embodiments, the hardware 3606 may be partially or fully located within the processor(s) 3602, e.g., a graphics processor.

Figure 4:
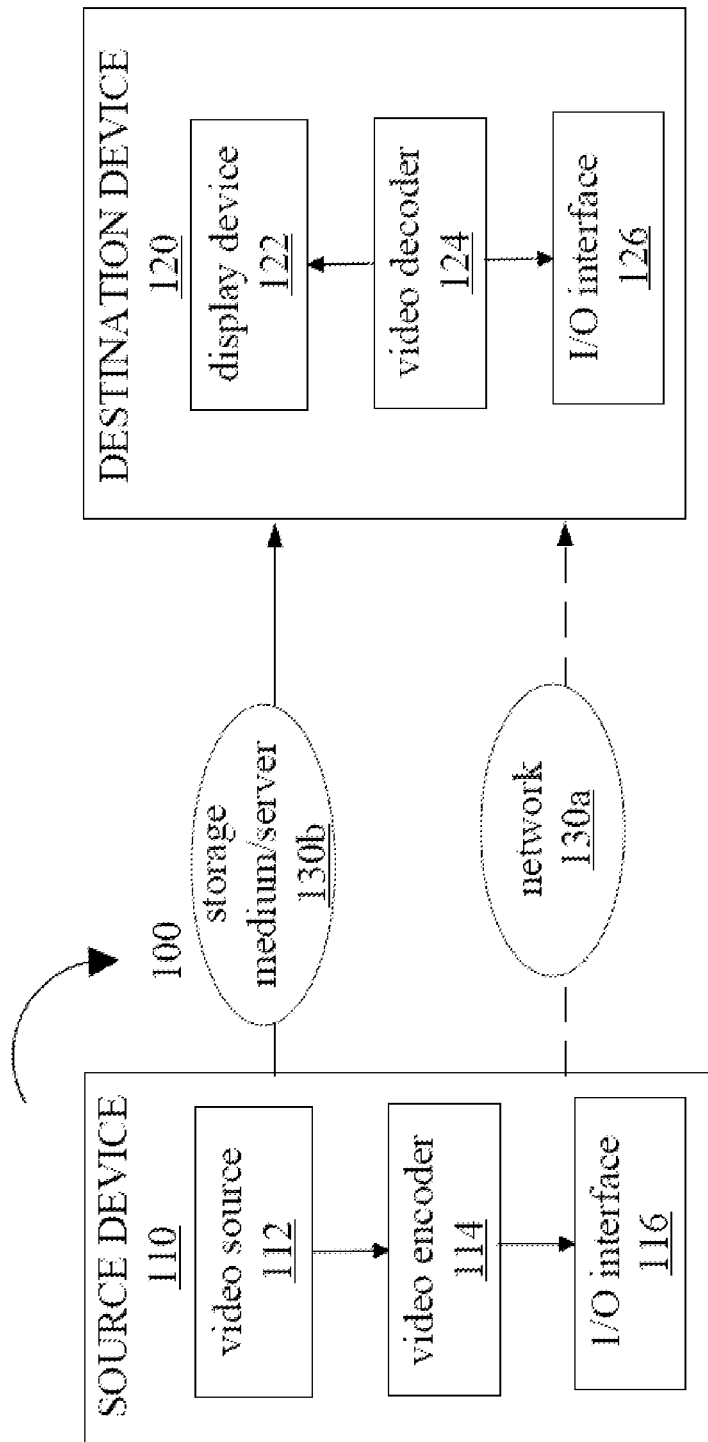
FIG. 4 is a block diagram that illustrates an example video coding system.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources.

The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding(VVM) standard and other current and/or further standards.

Figure 5:
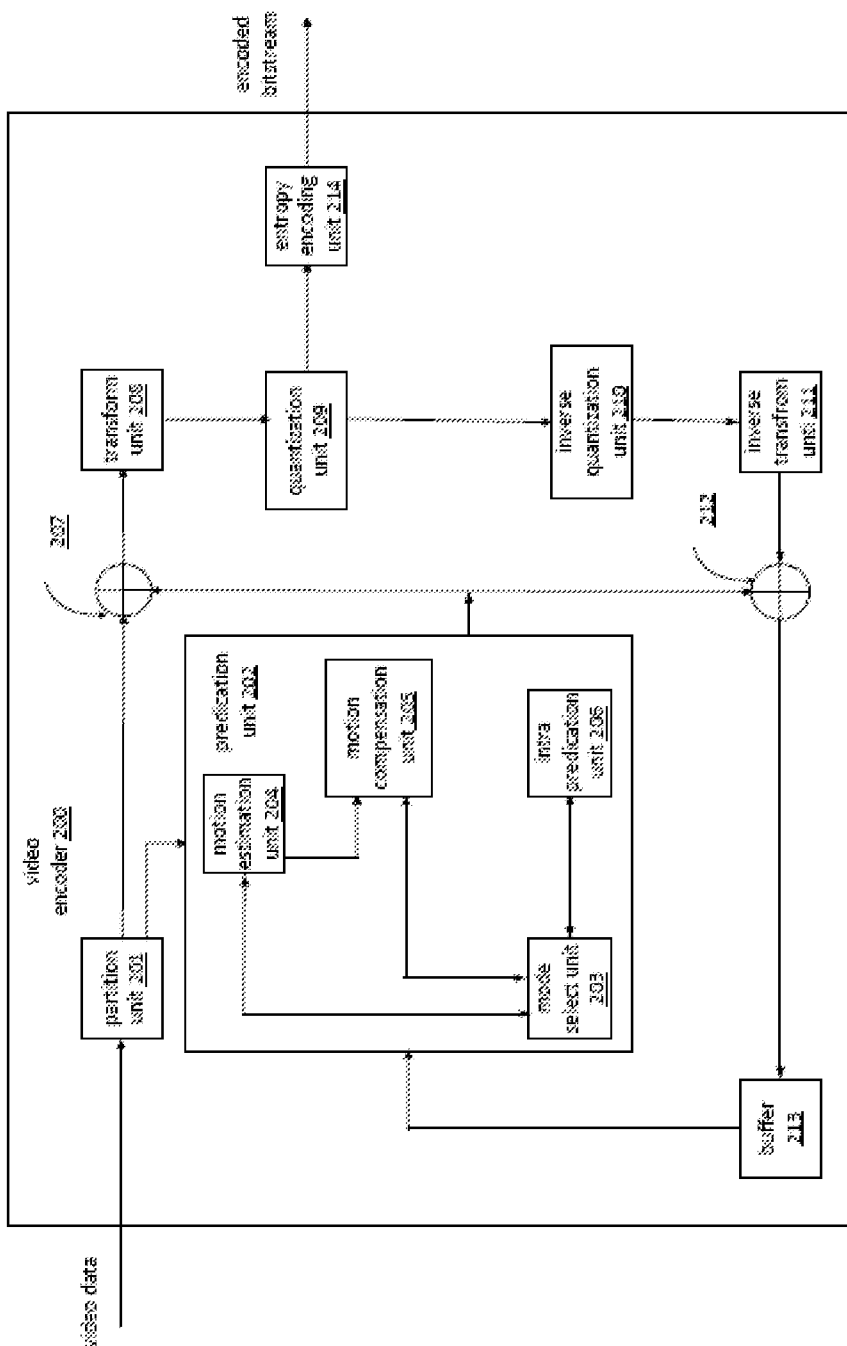
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference videoblock and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
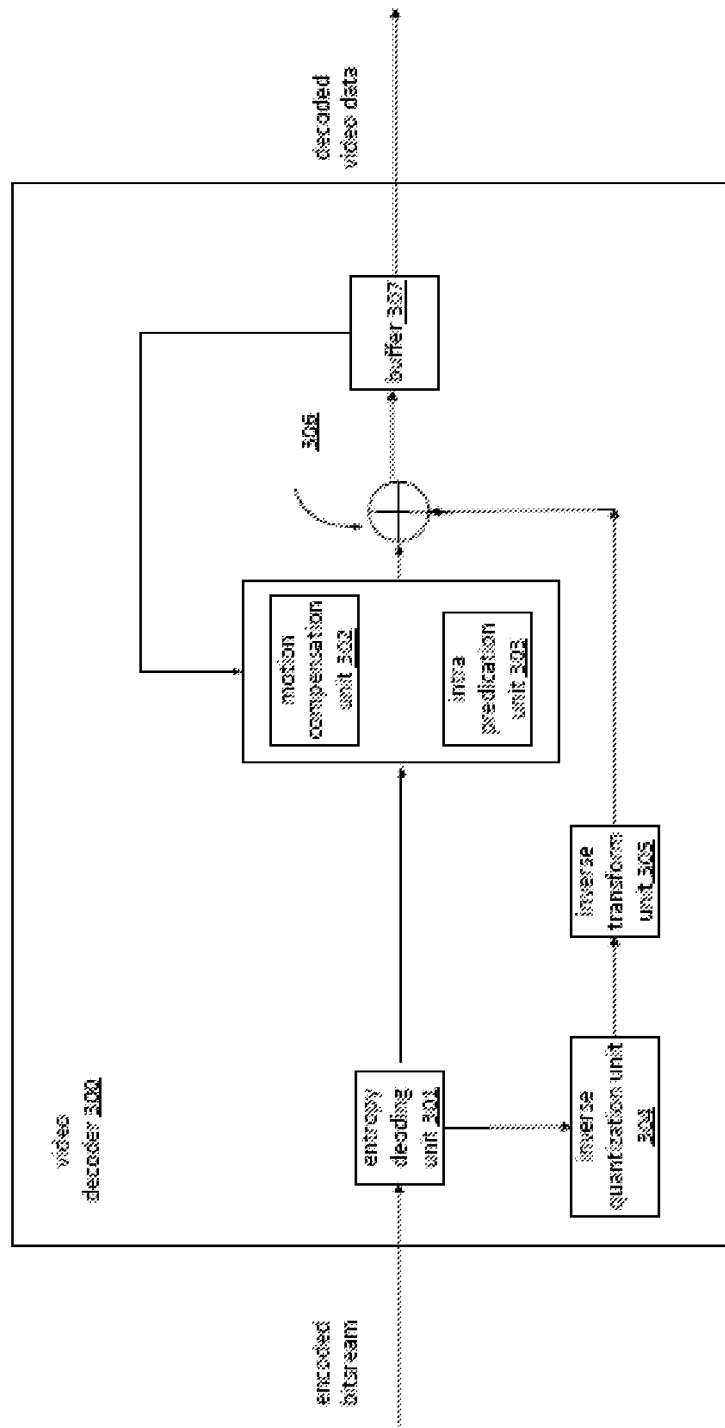
FIG. 6 is a block diagram that illustrates a decoder in accordance with some embodiments of the present disclosure.
Figure 7A:
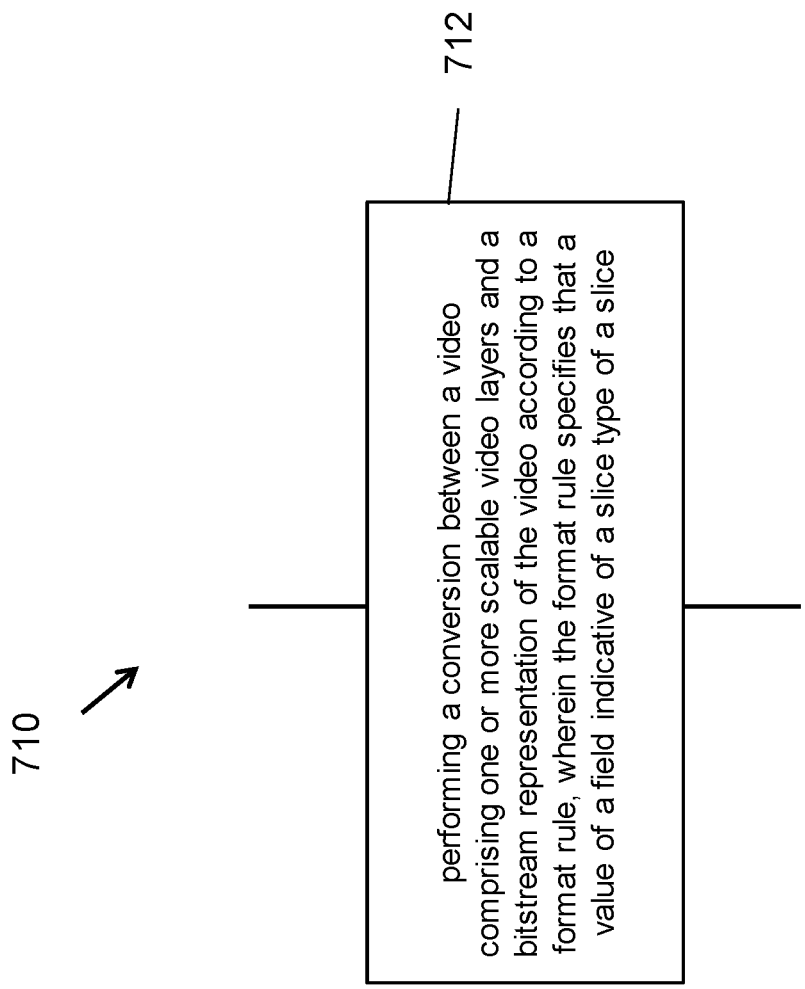
Figure 7B:
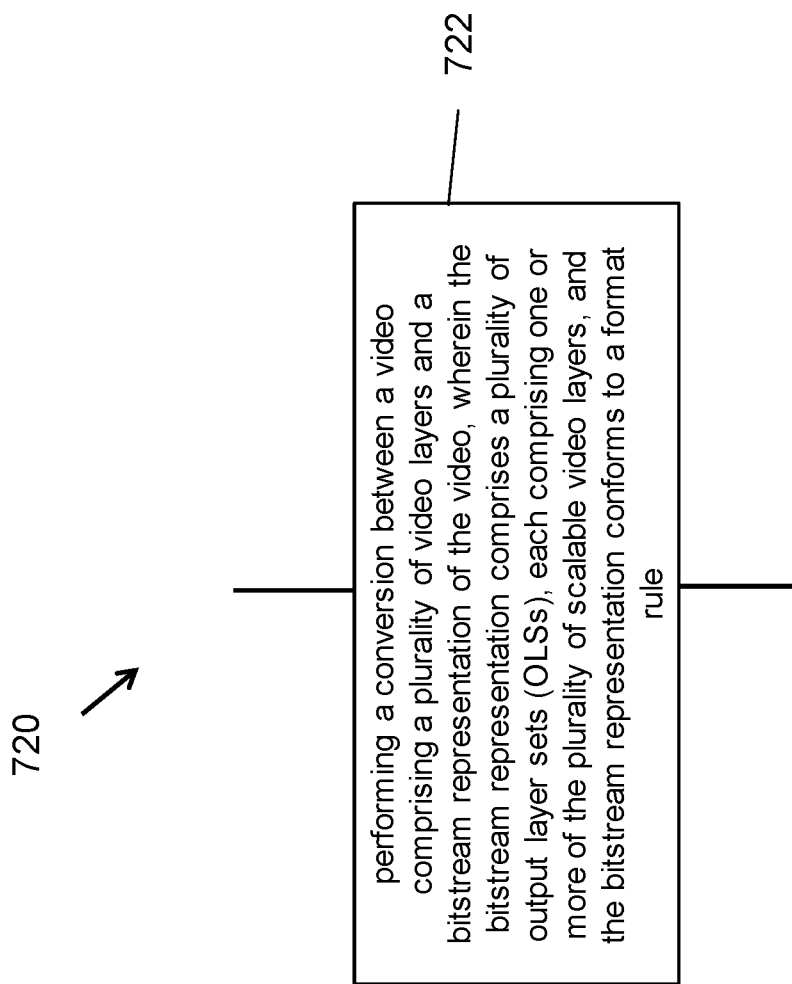
Figure 7C:
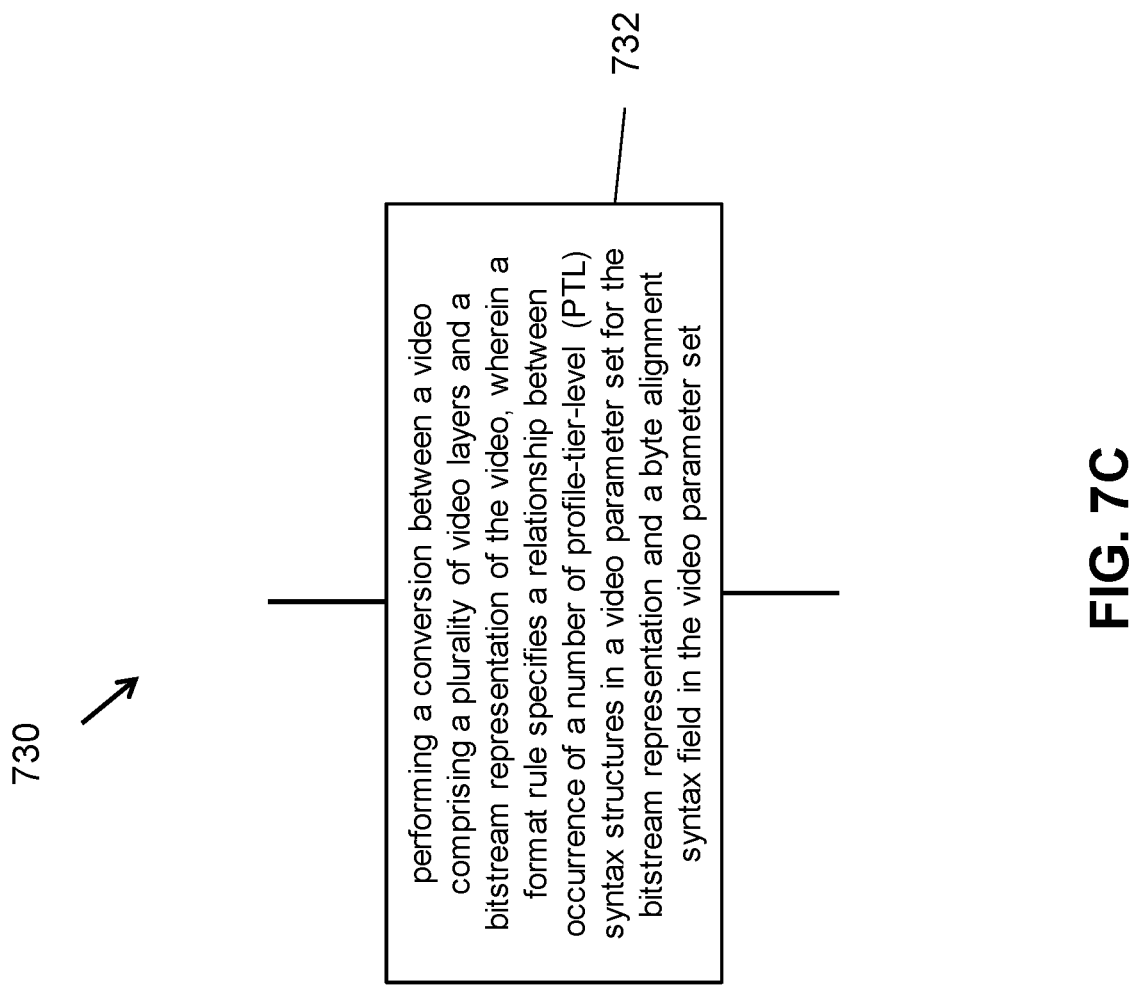
Figure 7D:
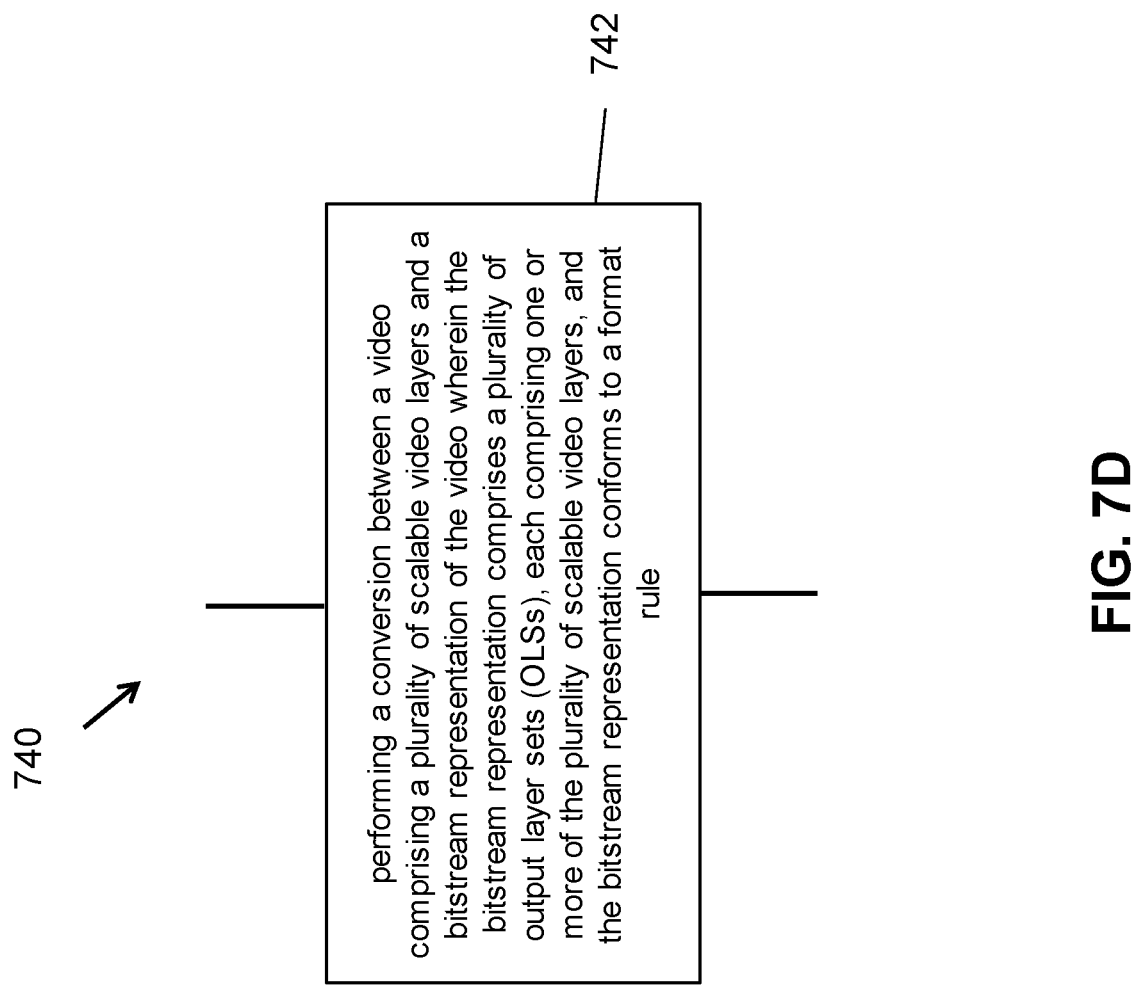
Figure 7E:
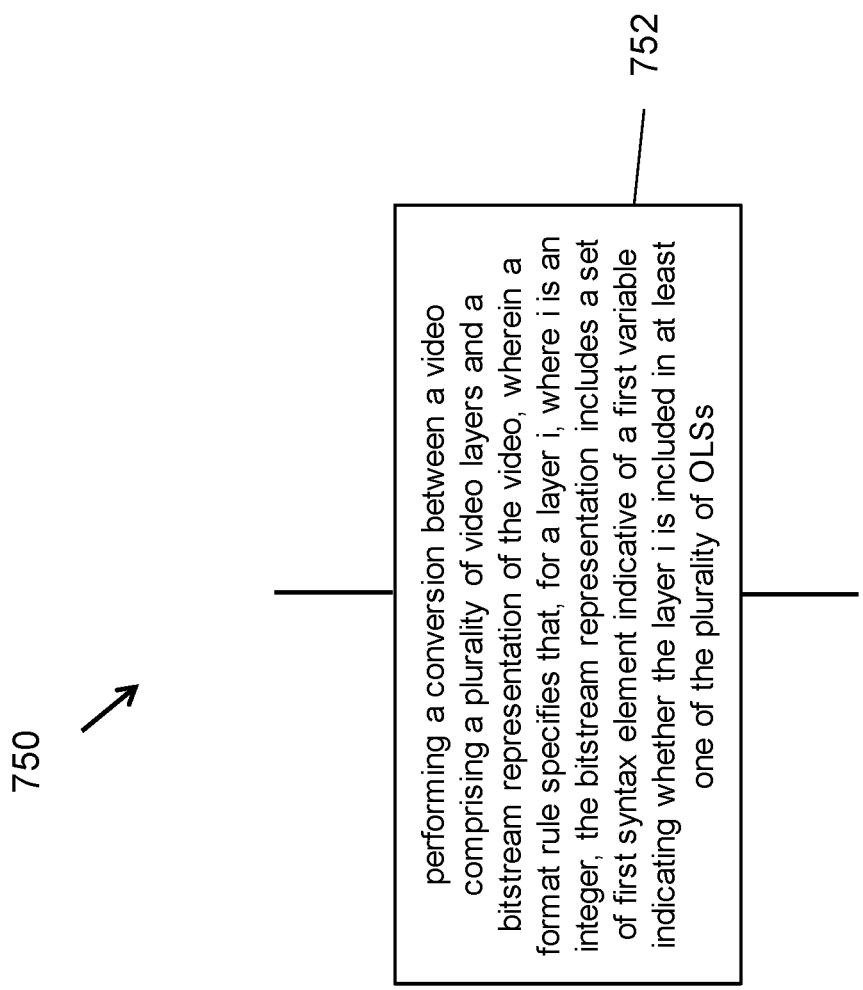
Figure 7F:
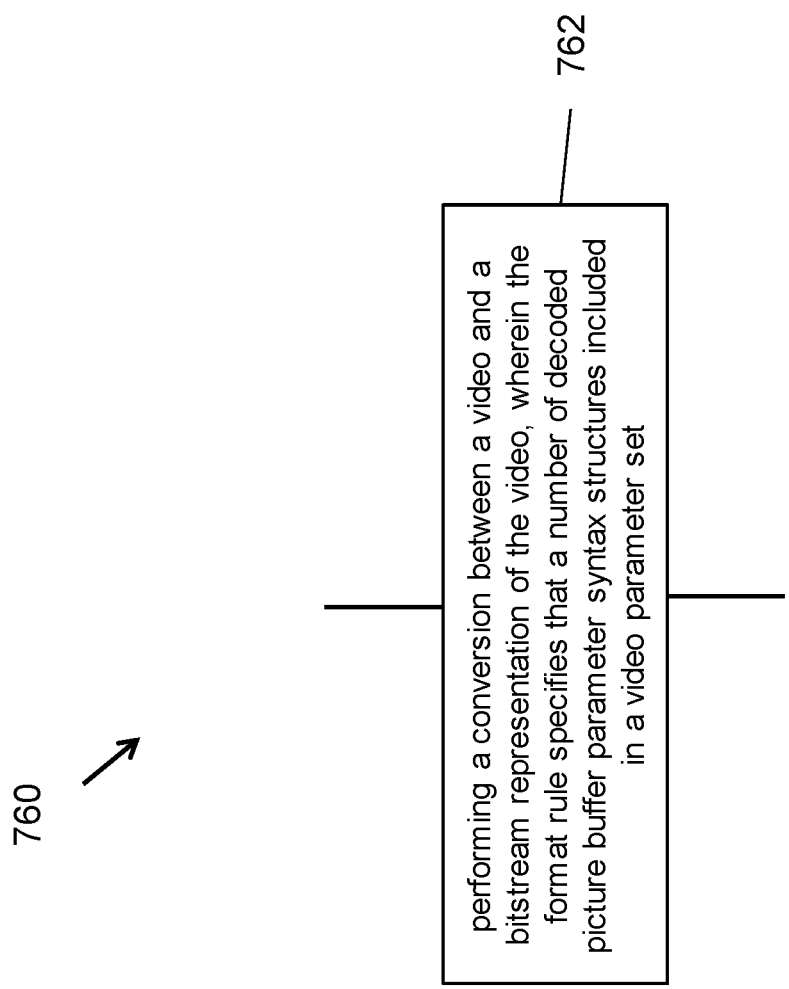
Figure 7G:
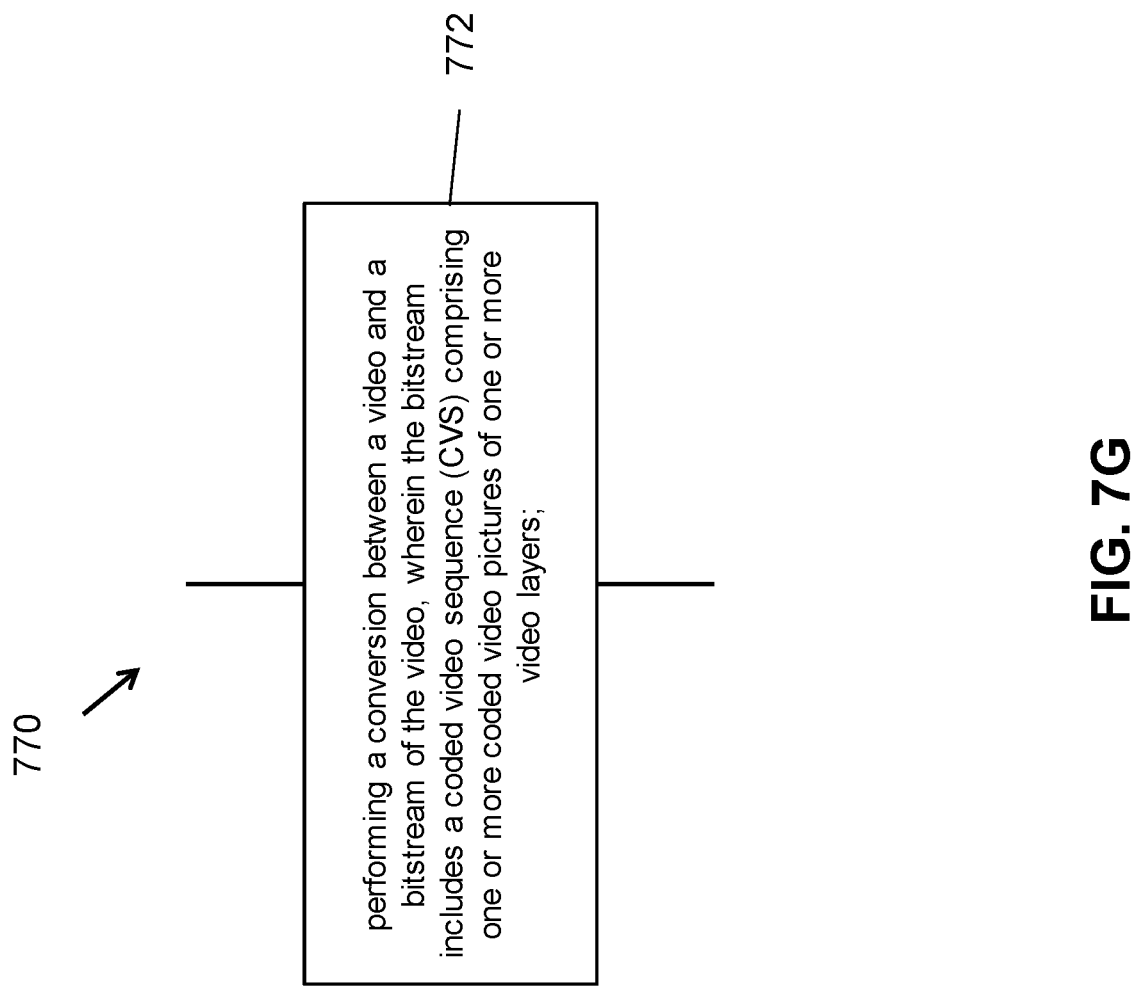
Figure 7H:
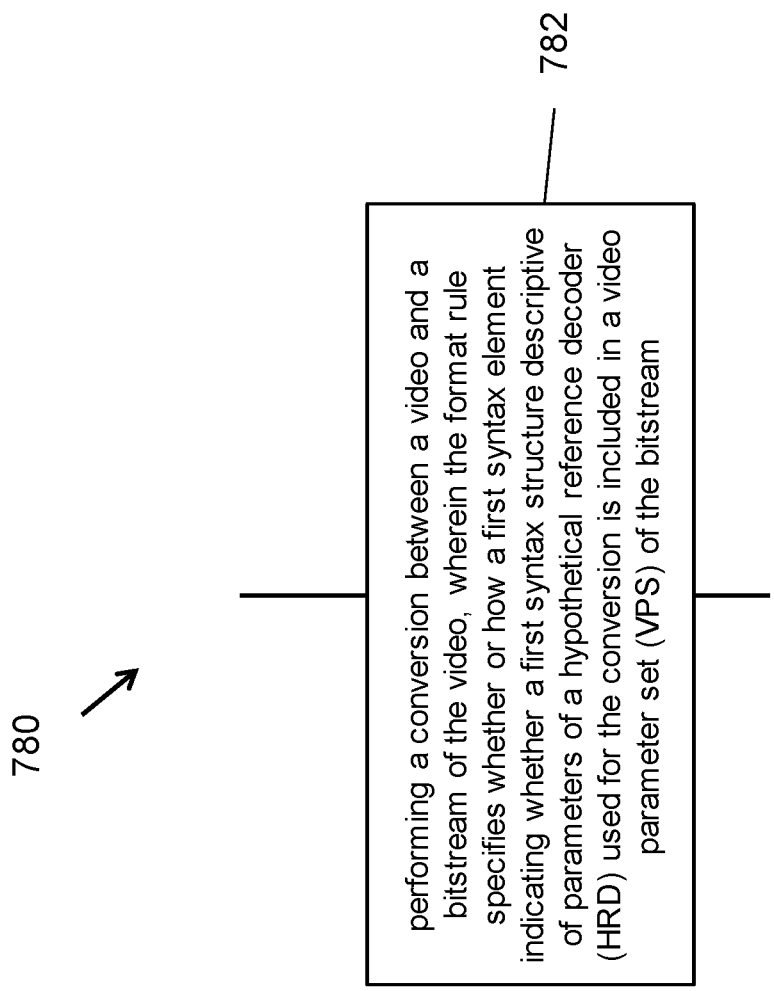

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 5, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., item 1).

Figure 3:
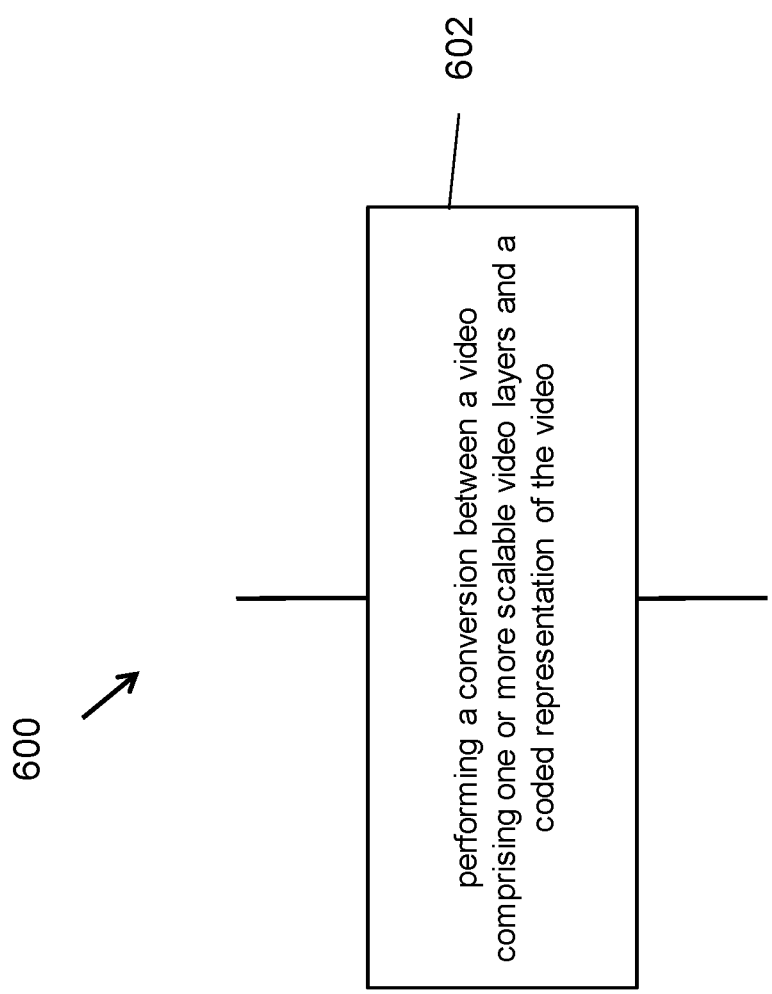
FIG. 3 is a flowchart for an example method of video processing.

1. A method of video processing (e.g., method 600 in FIG. 3), comprising: performing a conversion between a video comprising one or more scalable video layers and a coded representation of the video, wherein the coded representation conforms to a format rule, wherein the format rule specifies that a value of a field indicative of a slice type of a slice is set to indicate a type of intra slice in case that a corresponding network abstraction layer unit type is in a predetermined range and that a corresponding video layer flag indicates that a video layer corresponding to the slice does not use inter-layer prediction.
2. The method of solution 1, wherein the slice type of the slice is set to 2.
3. The method of solution 1, wherein the pre-determined range is from IDR_W_RADL to CRA_NUT, both inclusive.
4. A method of video processing, comprising: performing a conversion between a video comprising one or more scalable video layers and a coded representation of the video, wherein the coded representation conforms to a format rule, wherein the format rule specifies that an indication for an index to a syntax structure describing a profile and tier level of the one or more scalable video layers is inferred to be equal to 0 in case the index is excluded from the coded representation.
5. The method of solution 4, wherein the indication comprises an ols_ptl_idx[i] syntax element, where i is an integer.
6. A method of video processing, comprising: performing a conversion between a video comprising one or more scalable video layers and a coded representation of the video, wherein the coded representation contains a plurality of output layer sets (OLSs), wherein each OLS is a set of layers in the coded representation with the set of layers specified to be output, wherein the coded representation conforms to a format rule, wherein the format rule specifies that a video parameter set of the coded representation is permitted to have repetitive information regarding a profile, a tier and a level of an OLS in case that the OLS comprises a single layer.
7. The method of solution 6, wherein the format rule specifies to signal a number field indicative of a total number of the set of information regarding a profile, a tier and a level for the plurality of OLSs, where the total number is at least one.
8. The method of any of solutions 1-7, wherein the performing the conversion comprising encoding the video to generate the coded representation.
9. The method of any of solutions 1-7, wherein the performing the conversion comprises parsing and decoding the coded representation to generate the video.
10. A video decoding apparatus comprising a processor configured to implement a method recited in one or more of solutions 1 to 9.
11. A video encoding apparatus comprising a processor configured to implement a method recited in one or more of solutions 1 to 9.
12. A computer program product having computer code stored thereon, the code, when executed by a processor, causes the processor to implement a method recited in any of solutions 1 to 9.
13. A method, apparatus or system described in the present document.

With respect to FIGS. 7A to 7I, the following listed solutions may be preferably implemented in some embodiments.

For example, the following solutions may be implemented according to item 1 in previous section.

1. A method of video processing (e.g., method 710 depicted in FIG. 7A), comprising performing (712) a conversion between a video comprising one or more scalable video layers and a bitstream of the video, wherein the video comprises one or more video pictures comprising one or more slices; wherein the bitstream conforms to a format rule, wherein the format rule specifies that a value of a field indicative of a slice type of a slice is set to indicate a type of intra slice in case that a corresponding network abstraction layer unit type is in a predetermined range and that a corresponding video layer flag indicates that a video layer corresponding to the slice does not use inter-layer prediction.
2. The method of solution 1, wherein the slice type of the slice is set to 2.
3. The method of solution 1, wherein the pre-determined range is from IDR_W_RADL to CRA_NUT, both inclusive, wherein IDR_W_RADL indicates a slice having an instantaneous decoding refresh type and wherein CRA_NUT indicates a slice having a clean random access type.
4. The method of any of solutions 1-3, wherein the corresponding video layer flag corresponds to vps_independent_layer_flag[GeneralLayerIdx[nuh_layer_id]], wherein nuh_layer_id corresponds to an identifier of the video layer, GeneralLayerIdx[ ] is an index of the video layer and vps_independent_layer_flag corresponds to the video layer flag.
5. The method of any of solutions 1-4, wherein the performing the conversion comprising encoding the video into the bitstream.
6. The method of any of solutions 1-4, wherein the performing the conversion comprises parsing and decoding the video from the bitstream.
7. A method for storing bitstream of a video, comprising: generating a bitstream from the video comprising one or more scalable video layers; and storing the bitstream in a non-transitory computer-readable recording medium; wherein the video comprises one or more video pictures comprising one or more slices; wherein the bitstream conforms to a format rule, wherein the format rule specifies that a value of a field indicative of a slice type of a slice is set to indicate a type of I slice in case that a corresponding network abstraction layer unit type is in a predetermined range and that a corresponding video layer flag indicates that a video layer corresponding to the slice does not use inter-layer prediction.

For example, the following solutions may be implemented according to item 5 in previous section.

1. A method of video processing (e.g., method 720 depicted in FIG. 7B), comprising performing (722) a conversion between a video comprising a plurality of video layers and a bitstream of the video, wherein the bitstream comprises a plurality of output layer sets (OLSs), each comprising one or more of the plurality of scalable video layers, and the bitstream conforms to a format rule, wherein the format rule specifies that, for an OLS having a single layer, a profile-tier-level (PTL) syntax structure that indicates a profile, a tier and a level for the OLS is included in a video parameter set for the bitstream, and the PTL syntax structure for the OLS is also included in a sequence parameter set coded in the bitstream.

2. The method of solution 1, wherein the format rule specifies that a syntax element is included in the video parameter set indicative of a number of PTL syntax structures coded in the video parameter set.

3. The method of solution 2, wherein the number of PTL syntax structures coded in the video parameter set is equal to a value of the syntax element plus one.

4. The method of solution 2, wherein the number of PTL syntax structures coded in the video parameter set is equal to a value of the syntax element.

5. The method of solution 4, wherein the format rule specifies that the syntax element is coded in the video parameter set, during encoding, or parsed from the video parameter set, during decoding, when it is determined that one or more of the plurality of OLSs contain more than one video layer.

6. The method of solution 4, wherein the format rule specifies that the syntax element is coded in the video parameter set, during encoding, or parsed from the video parameter set, during decoding, when it is determined that a number of video layers is greater than 0 and one or more of the video layers uses inter-layer prediction.

7. The method of any of solutions 1 to 6, wherein the format rule further specified that, for an OLS having a single layer, a decoded picture buffer size parameter for the OLS is included in a video parameter set for the bitstream, and the decoded picture buffer size parameter for the OLS is also included in a sequence parameter set coded in the bitstream.

8. The method of any of solutions 1 to 6, wherein the format rule further specified that, for an OLS having a single layer, parameter information of the decoded picture buffer for the OLS is included in a video parameter set for the bitstream, and the parameter information of the decoded picture buffer for the OLS is also included in a sequence parameter set coded in the bitstream.

For example, the following solutions may be implemented according to item 6 in previous section.

9. A method of video processing (e.g., method 730 depicted in FIG. 7C), comprising: performing (732) a conversion between a video comprising a plurality of video layers and a bitstream of the video, wherein the bitstream comprises a plurality of output layer sets (OLSs), each of which comprises one or more of the plurality of video layers, and the bitstream conforms to a format rule, wherein the format rule specifies a relationship between occurrence of a number of profile-tier-level (PTL) syntax structures in a video parameter set for the bitstream and a byte alignment syntax field in the video parameter set; wherein each PTL syntax structure indicates a profile, a tier and a level of one or more of the plurality of OLSs.

10. The method of solution 9, wherein the format rule specifies that, at least one PTL syntax structure is included in the video parameter set, and due to inclusion of the at least one PTL syntax structure, one or more instances of the byte alignment syntax field are included in the video parameter set.

11. The method of solution 10, wherein the byte alignment syntax field is one bit.

12. The method of solution 11, wherein the value of each of the one or more instances of byte alignment syntax field has a value 0.

For example, the following solutions may be implemented according to item 2 in previous section.

13. A method of video processing (e.g., method 740 depicted in FIG. 7D), comprising performing (742) a conversion between a video comprising a plurality of scalable video layers and a bitstream of the video, wherein the bitstream comprises a plurality of output layer sets (OLSs), each comprising one or more of the plurality of scalable video layers, and the bitstream conforms to a format rule, wherein the format rule specifies that: during encoding, a syntax element indicative of an index to a syntax structure describing a profile, a tier and a level of one or more of the plurality of OLSs is excluded from a video parameter set for the bitstream in case that a value of the index is zero, or, during decoding, the value is inferred to be zero in case that the syntax element is not present in the bitstream.

14. The method of solution 13, wherein the index is to a syntax structure that indicates a profile, a tier and a level of at least one of the OLSs.

15. A method for storing bitstream of a video, comprising: generating a bitstream from the video comprising a plurality of video layers, and storing the bitstream in a non-transitory computer-readable recording medium; wherein the bitstream comprises a plurality of output layer sets (OLSs), each comprising one or more of the plurality of video layers, and the bitstream conforms to a format rule, wherein the format rule specifies that, for an OLS having a single layer, a profile-tier-level (PTL) syntax structure that indicates a profile, a tier and a level for the OLS is included in a video parameter set for the bitstream, and the PTL syntax structure for the OLS is also included in a sequence parameter set coded in the bitstream.

16. The method of any of solutions 1-14, wherein the performing the conversion comprises encoding the video into the bitstream; and the method further comprises storing the bitstream in a non-transitory computer-readable recording medium.

For example, the following solutions may be implemented according to item 3 in previous section.

1. A method of video processing (e.g., method 750 depicted in FIG. 7E), comprising performing (752) a conversion between a video comprising a plurality of video layers and a bitstream of the video, wherein the bitstream comprises a plurality of output layer sets (OLSs), each of which comprises one or more of the plurality of video layers, and the bitstream conforms to a format rule, wherein the format rule specifies that, for a layer i, where i is an integer, the bitstream includes a set of first syntax element indicative of a first variable indicating whether the layer i is included in at least one of the plurality of OLSs.

2. The method of solution 1, wherein the format rule specifies that, in case that, the first variable for the layer i is equal to zero, meaning that the layer i is not included in any of the plurality of OLSs, the bitstream excludes a second set of syntax element indicative of decoded picturebuffer parameters for the layer i.

3. The method of any of solutions 1-2, wherein the format rule further specifies that the bitstream includes a third set of syntax element that indicative of a second variable indicating whether the layer i is used as a reference layer for at least one of the plurality of video layers, and wherein the format rule disallows the first variable and the second variable to have zero values.
4. The method of solution 3, wherein, wherein the format rule disallows values of the first variable and the second variable are both equal to 0 which indicates that no layer that is neither a direct reference layer of any other layer nor an output layer of at least one OLS.
5. The method of any of solutions 1-4, wherein the first variable is a one-bit flag, denoted as LayerUsedAsOutputLayerFlag.
6. The method of solution 5, wherein the first variable is determined based on iteratively checking, for each of the plurality of video layers, a value of a third variable indicative of a relationship between a number of layers included in the plurality of OLSs.
7. The method of solution 6, wherein the third variable indicative of a relationship between number of layers included in the plurality of OLSs is permitted to have a value 0, 1, or 2.
8. The method of any of solutions 1-7, wherein the performing the conversion comprising encoding the video into the bitstream; and the method further comprises storing the bitstream in a non-transitory computer-readable recording medium.
9. A method for storing bitstream of a video, comprising: generating a bitstream from the video comprising a plurality of video layers, and storing the bitstream in a non-transitory computer-readable recording medium; wherein the bitstream comprises a plurality of output layer sets (OLSs), each of which comprises one or more of the plurality of video layers, and the bitstream conforms to a format rule, wherein the format rule specifies that, for a layer i, where i is an integer, the bitstream includes a set of first syntax element indicative of a first variable indicating whether the layer i is included in at least one of the plurality of OLSs.

For example, the following solutions may be implemented according to item 4 in previous section.
1. A method of video processing (e.g., method 760 depicted in FIG. 7F), comprising performing (762) a conversion between a video and a bitstream of the video, wherein the bitstream includes one or more output layer sets each comprising one or more video layers; wherein the bitstream conforms to a format rule, wherein the format rule specifies that a number of decoded picture buffer parameter syntax structures included in a video parameter set for the bitstream is equal to: zero, in a case that each output layer set includes a single video layer; or one plus a value of a syntax element, in a case that each output layer set includes a single layer is not true.
2. The method of solution 1, wherein the syntax element corresponds to a vps_num_dpb_params_minus1 syntax element.
3. The method of any of solutions 1-2, wherein the format rule specifies that, in case that another syntax element indicative of whether a same size is used for indicating decoded picture buffer syntax structures for video layers that are included and not included in the one or more output layer sets is absent in the video parameter set, a value of the another syntax element is inferred to be equal to 1.
4. The method of any of solutions 1-3, wherein the performing the conversion comprises encoding the video into the bitstream; and the method further comprises storing the bitstream in a non-transitory computer-readable recording medium.
5. A method for storing bitstream of a video, comprising: generating a bitstream from the video; and storing the bitstream in a non-transitory computer-readable recording medium; wherein the bitstream includes one or more output layer sets each comprising one or more video layers; wherein the bitstream conforms to a format rule, wherein the format rule specifies that a number of decoded picture buffer parameter syntax structures included in a video parameter set for the bitstream is equal to: zero, in a case that each output layer set includes a single video layer; or one plus a value of a syntax element, in a case that each output layer set includes a single layer is not true.

For example, the following solutions may be implemented according to item 7 in previous section.
1. A method of video processing (e.g., method 770 depicted in FIG. 7G), comprising performing (772) a conversion between a video and a bitstream of the video, wherein the bitstream includes a coded video sequence (CVS) comprising one or more coded video pictures of one or more video layers; and wherein the bitstream conforms to a format rule that specifies that one or more sequence parameter sets (SPS) indicative of conversion parameters that are referred to by the one or more coded pictures of the CVS have a same reference video parameter set (VPS) identifier indicative of a referenced VPS.
2. The method of solution 1, wherein the format rule further specifies that the same reference VPS identifier has a value greater than 0.
3. The method of any of solutions 1-2 wherein the format rule further specifies that a value zero for an SPS identifier is used in response to and only when the CVS comprises a single video layer.
4. The method of any of solutions 1-3, wherein the performing the conversion comprises encoding the video into the bitstream; and the method further comprises storing the bitstream in a non-transitory computer-readable recording medium.
5. A method for storing bitstream of a video, comprising: generating a bitstream from the video, and storing the bitstream in a non-transitory computer-readable recording medium; wherein the video comprises one or more video pictures comprising one or more slices; wherein the bitstream includes a coded video sequence (CVS) comprising one or more coded video pictures of one or more video layers; and wherein the bitstream conforms to a format rule that specifies that one or more sequence parameter sets (SPS) indicative of conversion parameters that are referred to by the one or more coded pictures of the CVS have a same reference video parameter set (VPS) identifier indicative of a referenced VPS.

For example, the following solutions may be implemented according to item 8 in previous section.
1. A method of video processing (e.g., method 780 depicted in FIG. 7H), comprising performing (782) a conversion between a video and a bitstream of the video, wherein the bitstream comprises one or more output layer sets (OLSs) each comprising one or more video layers, wherein the bitstream conforms to a format rule; wherein the format rule specifies whether or how a first syntax element indicating whether a first syntax structure descriptive of parameters of a hypothetical reference decoder (HRD) used for the conversion is included in a video parameter set (VPS) of the bitstream.
2. The method of solution 1, wherein the first syntax structure comprises a set of general HRD parameters.
3. The method of solutions 1-2, wherein the format rule specifies that the first syntax element is omitted from the VPS and is inferred to have a zero value when not present in the VPS due to each of the one or more video layers being included in an OLS of the one or more OLSs, and wherein each of the one or more OLSs comprises a single video layer
4. The method of solutions 1-2, wherein the format rule specifies that the first syntax element has a zero value in the VPS when present in the VPS due to each of the one or more video layers being included in an OLS of the one or more OLSs, and wherein each of the one or more OLSs comprises a single video layer.
5. The method of any of solutions 1-4, wherein the format rule further specifies whether or how a second syntax element indicative of a number of syntax structures descriptive of OLS-specific HRD parameters is included in the VPS.
6. The method of solution 5, wherein the format rule further specifies that the second syntax element is included in the VPS when the first syntax element has a value 1, regardless of whether the total number of OLSs in the one or more OLSs is greater than 1.

For example, the following solutions may be implemented according to items 9, 10 in previous section.

7. A method of video processing (e.g., method 790 depicted in FIG. 7I), comprising performing (792) a conversion between a video and a bitstream of the video, wherein the bitstream comprises one or more output layer sets (OLSs) each comprising one or more video layers, wherein the bitstream conforms to a format rule; wherein the format rule specifies whether or how a first syntax structure descriptive of general hypothetical reference decoder (HRD) parameters and a number of second syntax structures descriptive of OLS-specific HRD parameters are included in a video parameter set (VPS) for the bitstream.
8. The method of solution 7, wherein the format rule specifies to omit the first syntax structure from the VPS in case that no second syntax structure is included in the VPS.
9. The method of solution 7, wherein the format rule excludes inclusion of first syntax structure and the second syntax structures in the VPS for an OLS comprising only one video layer, and wherein the format rule permits inclusion of the first syntax structure and the second syntax structures an OLS comprising only one video layer.
10. A method for storing bitstream of a video, comprising: generating a bitstream from the video; storing the bitstream in a non-transitory computer-readable recording medium; wherein the bitstream comprises one or more output layer sets (OLSs) each comprising one or more video layers, wherein the bitstream conforms to a format rule; wherein the format rule specifies whether or how a first syntax element indicating whether a first syntax structure descriptive of parameters of a hypothetical reference decoder (HRD) used for the conversion is included in a video parameter set (VPS) of the bitstream.

The above-listed solutions may further include:

In some embodiments, in the above-listed solutions, the performing the conversion comprising encoding the video into the bitstream.

In some embodiments, in the above-listed solutions, the performing the conversion comprises parsing and decoding the video from the bitstream.

In some embodiments, in the above-listed solutions, the performing the conversion comprises encoding the video into the bitstream; and the method further comprises storing the bitstream in a non-transitory computer-readable recording medium.

In some embodiments, a video decoding apparatus includes a processor configured to implement a method recited in one or more of above-listed solutions.

In some embodiments, a video encoding apparatus includes a processor configured to implement a method recited in one or more of above-listed solutions.

In some embodiments, a non-transitory computer-readable storage medium may store instructions that cause a processor to implement a method recited in one or more of above-listed solutions.

In some embodiments, a non-transitory computer-readable recording medium storing a bitstream of a video which is generated by a method recited in one or more of above-listed solutions.

In some embodiments, the above-described encoding methods may be implemented by an apparatus and the apparatus may further write a bitstream generated by implementing the method to a computer-readable medium.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g, a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
performing a conversion between a video and a bitstream of the video,
wherein the bitstream includes one or more output layer sets each comprising one or more video layers;
wherein the bitstream conforms to a format rule,
wherein the format rule specifies that, in case that a value of a third syntax element vps_max_layers_minus1 is equal to 0, a value of a first syntax element vps_all_independent_layers_flag indicating whether all layers specified by a video parameter set for the bitstream are independently coded without using inter-layer prediction is equal to 1, a value of a second syntax element each_layer_is_an_ols_flag in the video parameter set indicating whether each output layer set includes a single video layer is equal to 1, and a value of a variable VpsNumDpbParams indicating a number of decoded picture buffer parameter syntax structures included in the video parameter set is equal to zero,
wherein the third syntax element plus 1 specifies a maximum allowed number of layers in each coded video sequence referring to the video parameter set.

2. The method of claim 1, wherein the format rule specifies that the variable VpsNumDpbParams indicating the number of decoded picture buffer parameter syntax structures is equal to one plus a value of a fourth syntax element in a case that each output layer set includes a single video layer is not true.

3. The method of claim 2, wherein the fourth syntax element corresponds to a vps_num_dpb_params_minus1 syntax element.

4. The method of claim 1, wherein the format rule specifies that a fifth syntax element indicative of an index, to a list of the decoded picture buffer parameter syntax structures included in the video parameter set, of a decoded picture buffer parameter syntax structure that applies to an output layer set is conditionally included in the video parameter set.

5. The method of claim 4, wherein when the fifth syntax element is present, a value of the fifth syntax element is in a range of 0 to the number of decoded picture buffer parameter syntax structures minus 1.

6. The method of claim 4, wherein when the fifth syntax element is not present and the number of decoded picture buffer parameter syntax structures is equal to 1, a value of the fifth syntax element is inferred to be equal to 0.

7. The method of claim 1, wherein the format rule specifies that, in case that a sixth syntax element indicative of whether a same size is used for indicating decoded picture buffer syntax structures for video layers that are included and not included in the one or more output layer sets is absent in the video parameter set, a value of the sixth syntax element is inferred to be equal to 1.

8. The method of claim 1, wherein the performing the conversion comprising encoding the video into the bitstream.

9. The method of claim 1, wherein the performing the conversion comprises decoding the video from the bitstream.

10. An apparatus for processing video data comprising a processor and a non-transitory memory with instructions thereon, wherein the instructions upon execution by the processor, cause the processor to:
perform a conversion between a video and a bitstream of the video, wherein the bitstream includes one or more output layer sets each comprising one or more video layers;

wherein the bitstream conforms to a format rule, wherein the format rule specifies that, in case that a value of a third syntax element vps_max_layers_minus1 is equal to 0, a value of a first syntax element vps_all_independent_layers_flag indicating whether all layers specified by a video parameter set for the bitstream are independently coded without using inter-layer prediction is equal to 1, a value of a second syntax element each_layer_is_an_ols_flag in the video parameter set indicating whether each output layer set includes a single video layer is equal to 1, and a value of a variable VpsNumDpbParams indicating a number of decoded picture buffer parameter syntax structures included in the video parameter set is equal to zero, wherein the third syntax element plus 1 specifies a number of layers, which is a maximum allowed number of layers in each coded video sequence referring to the video parameter set.

11. The apparatus of claim 10, wherein the format rule specifies that the variable VpsNumDpbParams indicating the number of decoded picture buffer parameter syntax structures is equal to one plus a value of a fourth syntax element in a case that each output layer set includes a single video layer is not true, and wherein the fourth syntax element corresponds to a vps_num_dpb_params_minus1 syntax element.

12. The apparatus of claim 10, wherein the format rule specifies that a fifth syntax element indicative of an index, to a list of the decoded picture buffer parameter syntax structures included in the video parameter set, of a decoded picture buffer parameter syntax structure that applies to an output layer set is conditionally included in the video parameter set, wherein when the fifth syntax element is present, a value of the fifth syntax element is in a range of 0 to the number of decoded picture buffer parameter syntax structures minus 1, and wherein when the fifth syntax element is not present and the number of decoded picture buffer parameter syntax structures is equal to 1, a value of the fifth syntax element is inferred to be equal to 0.

13. A non-transitory computer-readable storage medium storing instructions that cause a processor to:

perform a conversion between a video and a bitstream of the video, wherein the bitstream includes one or more output layer sets each comprising one or more video layers;

wherein the bitstream conforms to a format rule, wherein the format rule specifies that, in case that a value of a third syntax element vps_max_layers_minus1 is equal to 0, a value of a first syntax element vps_all_independent_layers_flag indicating whether all layers specified by a video parameter set for the bitstream are independently coded without using inter-layer prediction is equal to 1, a value of a second syntax element each_layer_is_an_ols_flag in the video parameter set indicating whether each output layer set includes a single video layer is equal to 1, and a value of a variable VpsNumDpbParams indicating a number of decoded picture buffer parameter syntax structures included in the video parameter set is equal to zero, wherein the syntax element plus 1 specifies a number of layers, which is a maximum allowed number of layers in each coded video sequence referring to the video parameter set.

14. The non-transitory computer-readable storage medium of claim 13, wherein the format rule specifies that a fifth syntax element indicative of an index, to a list of the decoded picture buffer parameter syntax structures included in the video parameter set, of a decoded picture buffer parameter syntax structure that applies to an output layer set is conditionally included in the video parameter set, wherein when the fifth syntax element is present, a value of the fifth syntax element is in a range of 0 to the number of decoded picture buffer parameter syntax structures minus 1, and wherein when the fifth syntax element is not present and the number of decoded picture buffer parameter syntax structures is equal to 1, a value of the fifth syntax element is inferred to be equal to 0.

15. The non-transitory computer-readable storage medium of claim 13, wherein the format rule specifies that the variable VpsNumDpbParams indicating the number of decoded picture buffer parameter syntax structures is equal to one plus a value of a fifth syntax element in a case that each output layer set includes a single video layer is not true.

16. The non-transitory computer-readable storage medium of claim 15, wherein the third syntax element corresponds to a vps_num_dpb_params_minus1 syntax element.

17. A non-transitory computer-readable recording medium storing a bitstream of a video which is generated by a method performed by a video processing apparatus, wherein the method comprises:

generating the bitstream of the video, wherein the bitstream includes one or more output layer sets each comprising one or more video layers;

wherein the bitstream conforms to a format rule, wherein the format rule specifies that, in case that a value of a third syntax element vps_max_layers_minus1 is equal to 0, a value of a first syntax element vps_all_independent_layers_flag indicating whether all layers specified by a video parameter set for the bitstream are independently coded without using inter-layer prediction is equal to 1, a value of a second syntax element each_layer_is_an_ols_flag in the video parameter set indicating whether each output layer set includes a single video layer is equal to 1, and a value of a variable VpsNumDpbParams indicating a number of decoded picture buffer parameter syntax structures included in the video parameter set is equal to zero, wherein the third syntax element plus 1 specifies a number of layers, which is a maximum allowed number of layers in each coded video sequence referring to the video parameter set.

18. The non-transitory computer-readable recording medium of claim 17, wherein the format rule specifies that a fifth syntax element indicative of an index, to a list of the decoded picture buffer parameter syntax structures included in the video parameter set, of a decoded picture buffer parameter syntax structure that applies to an output layer set is conditionally included in the video parameter set, wherein when the fifth syntax element is present, a value of the fifth syntax element is in a range of 0 to the number of decoded picture buffer parameter syntax structures minus 1, and wherein when the fifth syntax element is not present and a count number of decoded picture buffer parameter syntax structures is equal to 1, a value of the fifth syntax element is inferred to be equal to 0.

19. The non-transitory computer-readable recording medium of claim 17, wherein the format rule specifies that the variable VpsNumDpbParams indicating the number of decoded picture buffer parameter syntax structures is equal to one plus a value of a fourth syntax element in a case that each output layer set includes a single video layer is not true.

20. The non-transitory computer-readable recording medium of claim 19, wherein the fourth syntax element corresponds to a vps_num_dpb_params_minus1 syntax element.

* * * * *